(12) United States Patent
Go et al.

(10) Patent No.: US 12,199,907 B2
(45) Date of Patent: Jan. 14, 2025

(54) METHOD FOR TRANSMITTING AND RECEIVING UPLINK SIGNAL IN WIRELESS COMMUNICATION SYSTEM, AND DEVICE THEREFOR

(71) Applicant: LG ELECTRONICS INC., Seoul (KR)

(72) Inventors: Seongwon Go, Seoul (KR); Jonghyun Park, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 449 days.

(21) Appl. No.: 17/616,437

(22) PCT Filed: Jun. 4, 2020

(86) PCT No.: PCT/KR2020/007262
§ 371 (c)(1),
(2) Date: Dec. 3, 2021

(87) PCT Pub. No.: WO2020/246819
PCT Pub. Date: Dec. 10, 2020

(65) Prior Publication Data
US 2022/0239440 A1    Jul. 28, 2022

Related U.S. Application Data

(60) Provisional application No. 62/857,786, filed on Jun. 5, 2019.

(51) Int. Cl.
*H04L 5/00* (2006.01)
*H04B 7/0404* (2017.01)

(52) U.S. Cl.
CPC ......... *H04L 5/0051* (2013.01); *H04B 7/0404* (2013.01); *H04L 5/0003* (2013.01); *H04L 5/0092* (2013.01)

(58) Field of Classification Search
None
See application file for complete search history.

(56) References Cited

U.S. PATENT DOCUMENTS

2020/0100193 A1*  3/2020  Cheng ................. H04W 52/146
2020/0314860 A1*  10/2020  Zhou ..................... H04W 72/23
(Continued)

FOREIGN PATENT DOCUMENTS

| CN | 109587793 | 4/2019 |
|----|-----------|--------|
| KR | 20190035633 | 4/2019 |
| WO | WO2019097294 | 5/2019 |

OTHER PUBLICATIONS

International Search Report in International Appln. No. PCT/KR2020/007262, dated Sep. 21, 2020, 5 pages (with English translation).

(Continued)

*Primary Examiner* — Alex Skripnikov
*Assistant Examiner* — Angelie T Ngo
(74) *Attorney, Agent, or Firm* — Fish & Richardson P.C.

(57) ABSTRACT

A method by which a terminal transmits an uplink signal in a wireless communication system, according to one embodiment of the present specification, comprises the steps of: receiving configuration information related to the transmission of the uplink signal; and transmitting the uplink signal on the basis of the configuration information. The configuration information includes a transmission configuration indicator state (TCI state). The uplink signal is transmitted on the basis of a specific panel and/or a specific spatial domain filter, according to the TCI state in which the panel ID and/or the reference RS is not configured.

14 Claims, 22 Drawing Sheets

(56) References Cited

U.S. PATENT DOCUMENTS

| | | | | |
|---|---|---|---|---|
| 2020/0351794 A1* | 11/2020 | Xu | ...................... | H04B 7/0874 |
| 2021/0136739 A1* | 5/2021 | Chen | ..................... | H04L 5/0048 |
| 2022/0166482 A1* | 5/2022 | Yu | ........................ | H04B 7/0695 |
| 2022/0248411 A1* | 8/2022 | Jung | .................... | H04W 72/21 |
| 2022/0321292 A1* | 10/2022 | Matsumura | ........... | H04W 72/23 |

OTHER PUBLICATIONS

LG Electronics, "Feature lead summary#2 of Enhancements on Multi-beam Operations," R1-1907768, Presented at 3GPP TSG RAN WG1 Meeting #97, Reno, USA, May 13-17, 2019, 34 pages.
Samsung, "Enhancements on multi-beam operations," R1-1906969, Presented at 3GPP TSG RAN WG1 97, Reno, USA, May 13-17, 2019, 11 pages.
EP Extended European Search Report in European Appln. No. 20819397.9, mailed on Jun. 5, 2023, 11 pages.
LG Electronics, "Feature lead summary#3 of Enhancements on Multi-beam Operations," R1-1907860, 3GPP TSG RAN WG1 Meeting #97, Reno, USA, dated May 13-17, 2019, 35 pages.
LG Electronics, "Feature lead summary#4 of Enhancements on Multi-beam Operations," R1-1909779, 3GPP TSG RAN WG1 Meeting #98, Prague, CZ, dated Aug. 26-30, 2019, 38 pages.

\* cited by examiner

【FIG. 1】
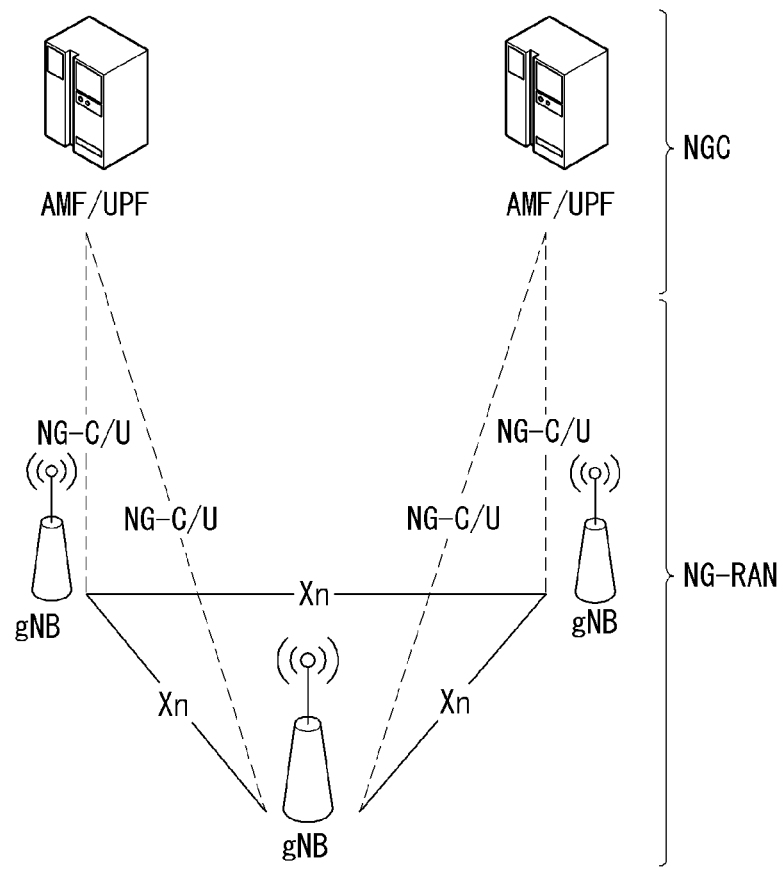
【FIG. 2】
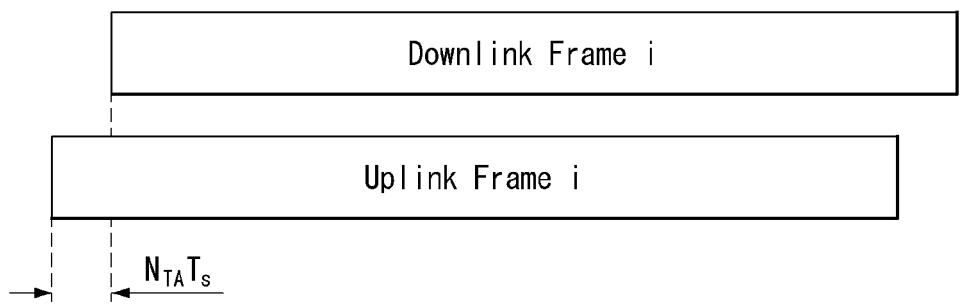

[FIG. 3]
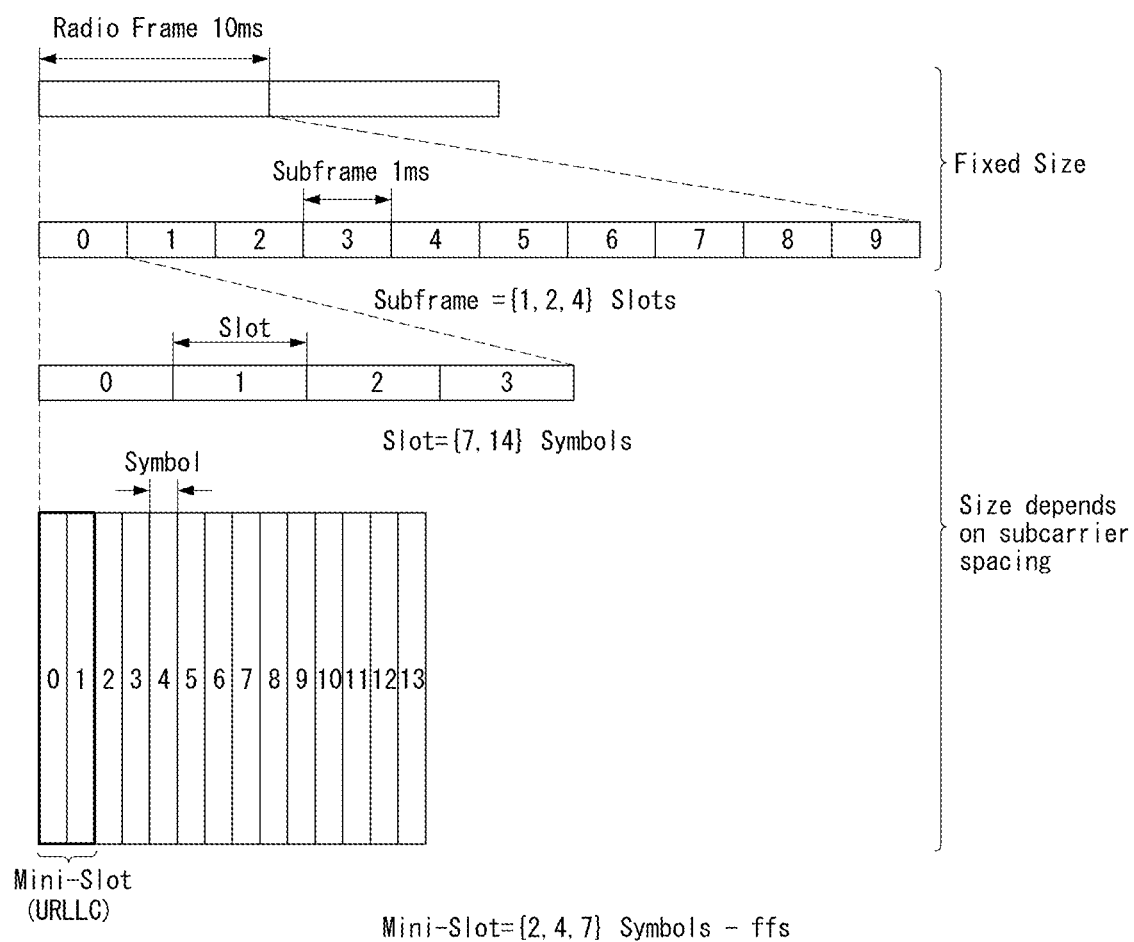

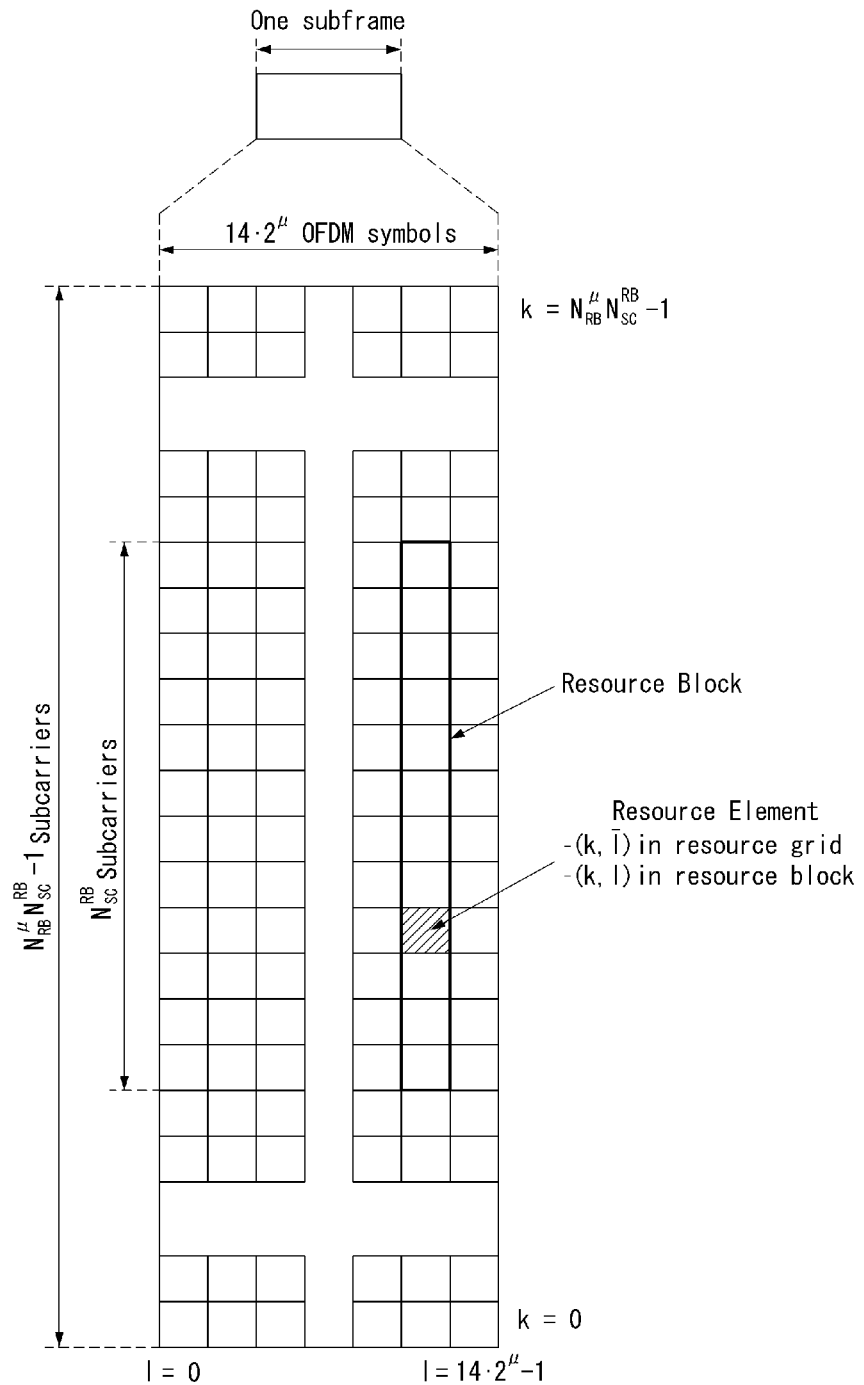

[FIG. 5]
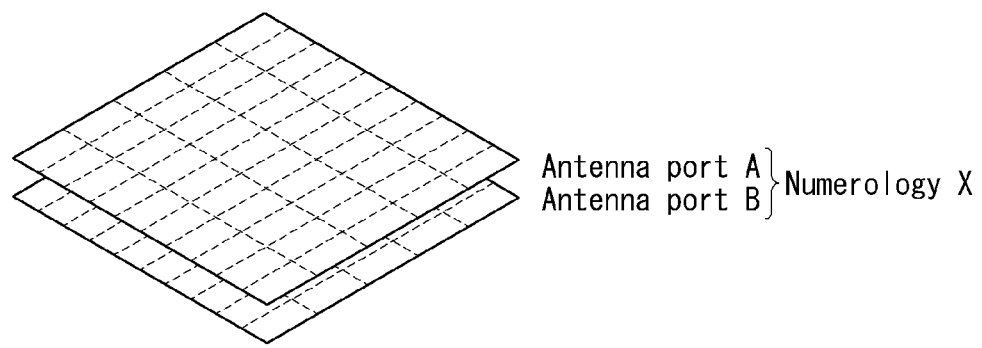
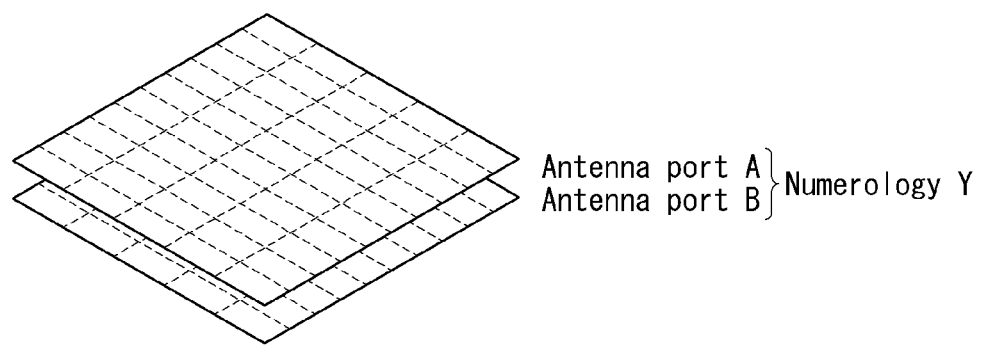

[FIG. 6]
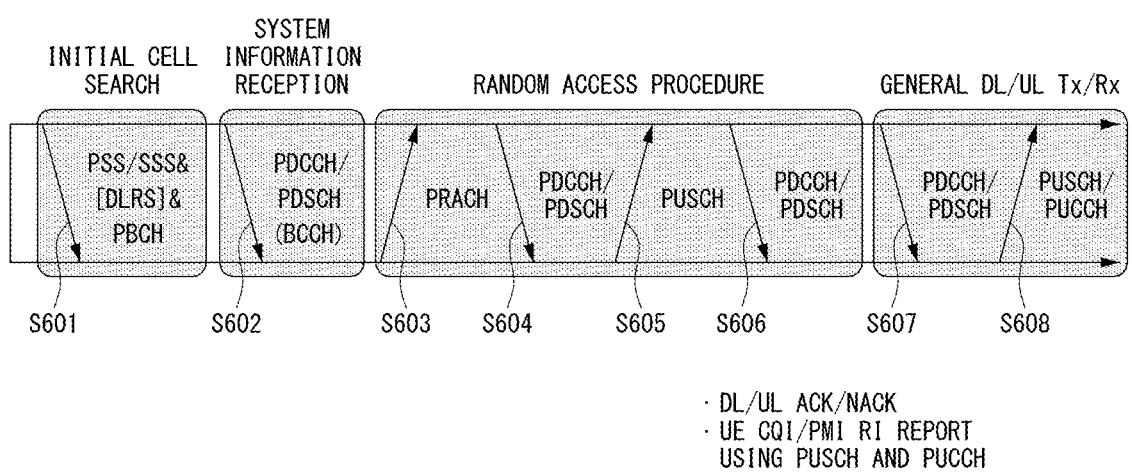

[FIG. 7]
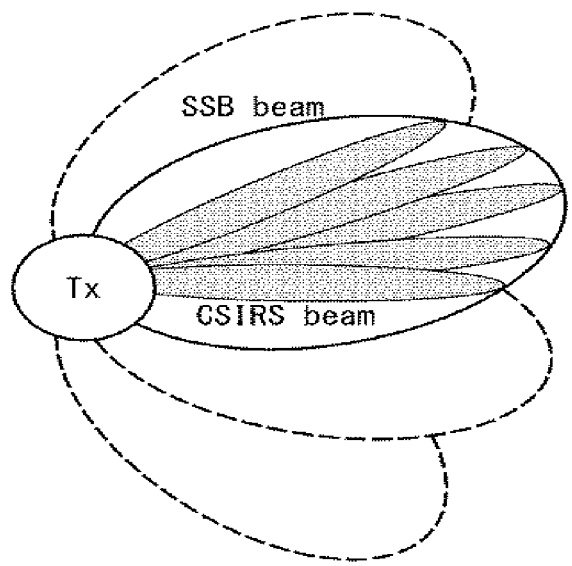
[FIG. 8]
Base station Rx beam sweeping
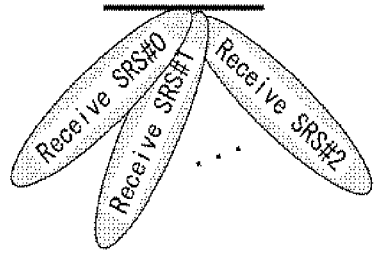
Base station beam being fixed
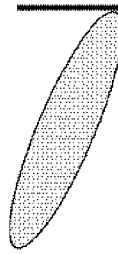
UE TX beam (being fixed)
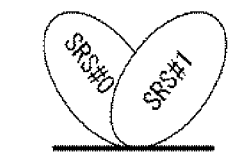
UE Tx beam sweeping
(a)            (b)

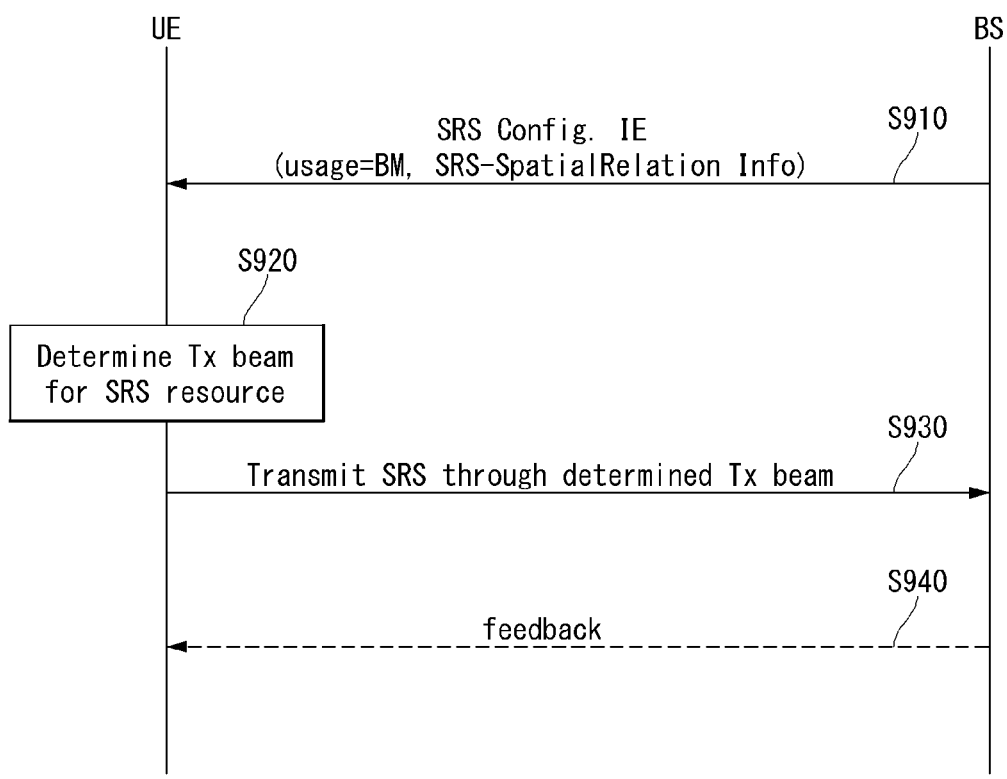

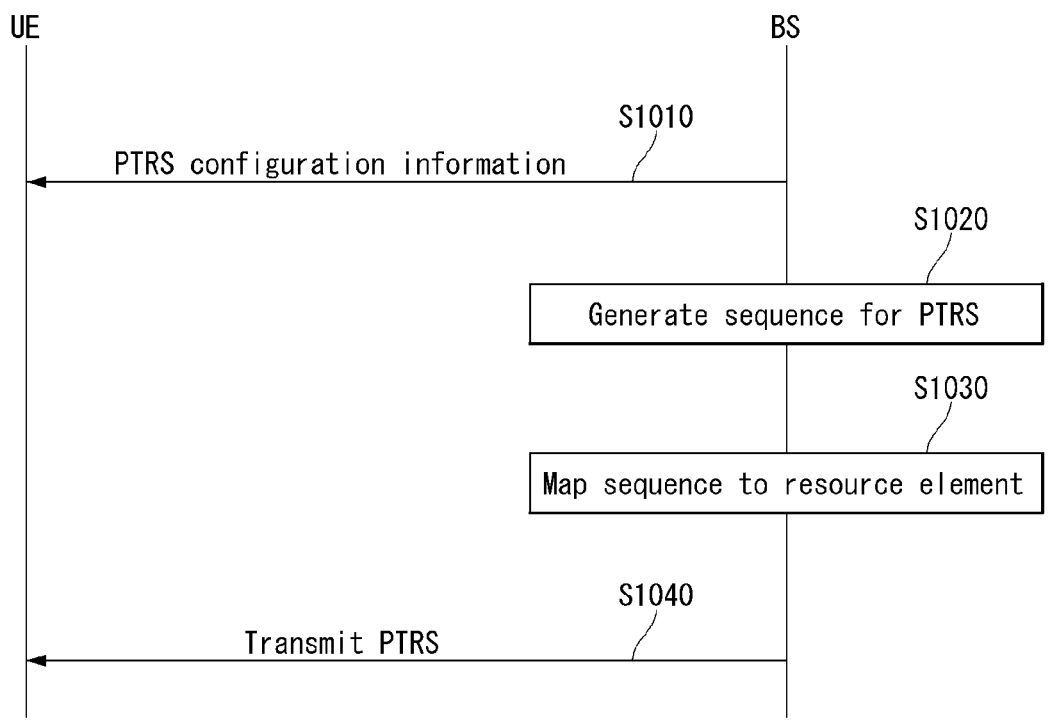
[FIG. 10]

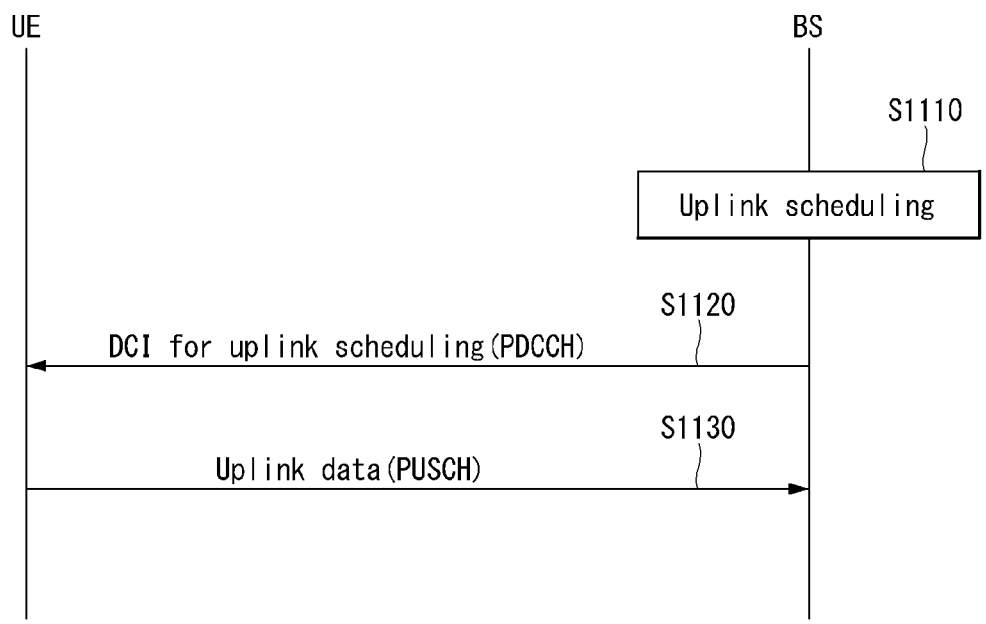
[FIG. 11]

[FIG. 12]
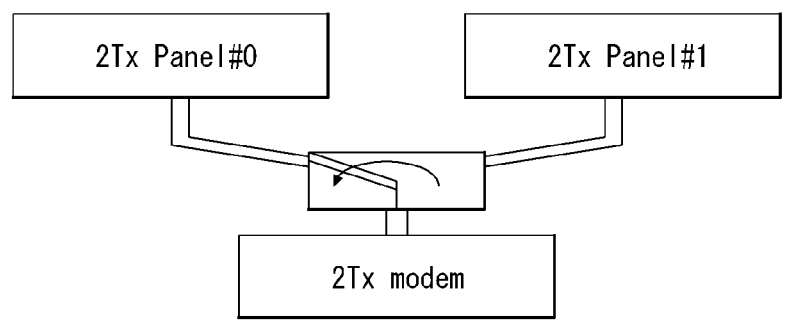

[FIG. 13]
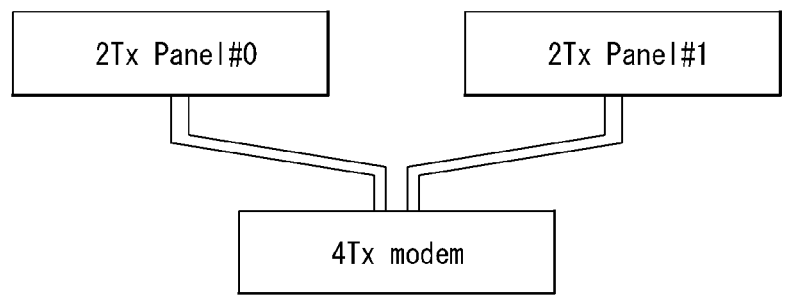

[FIG. 14]
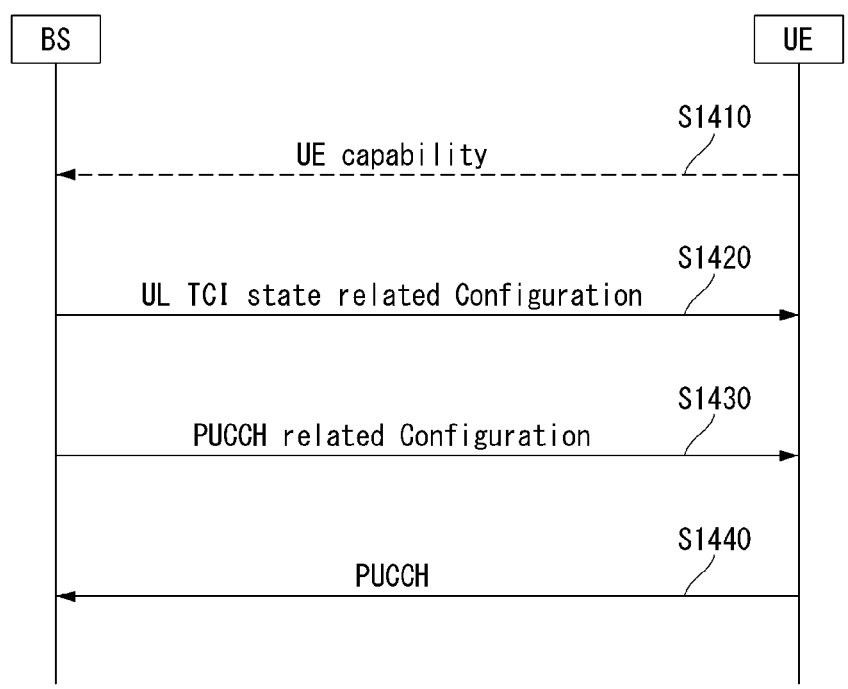

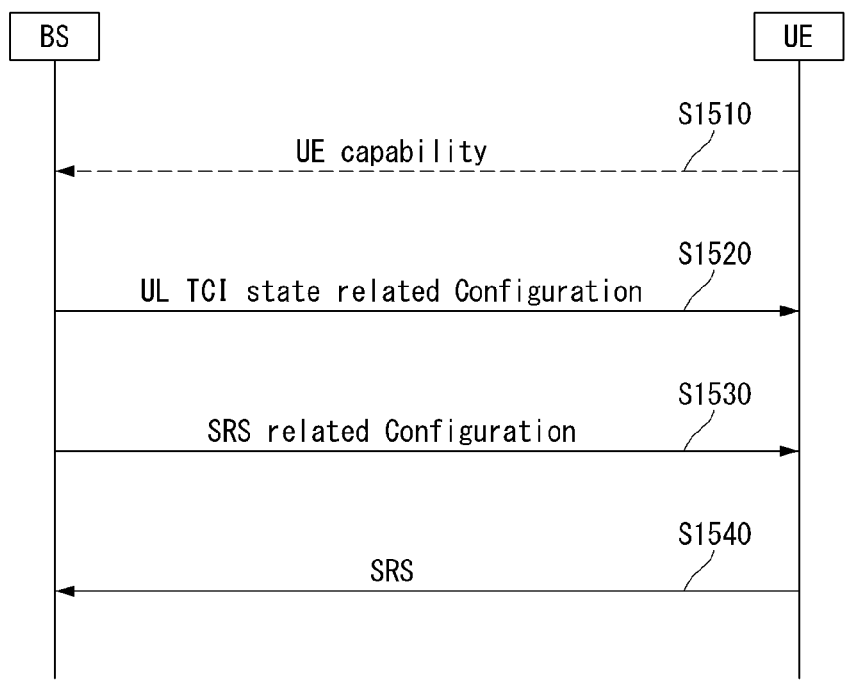
[FIG. 15]

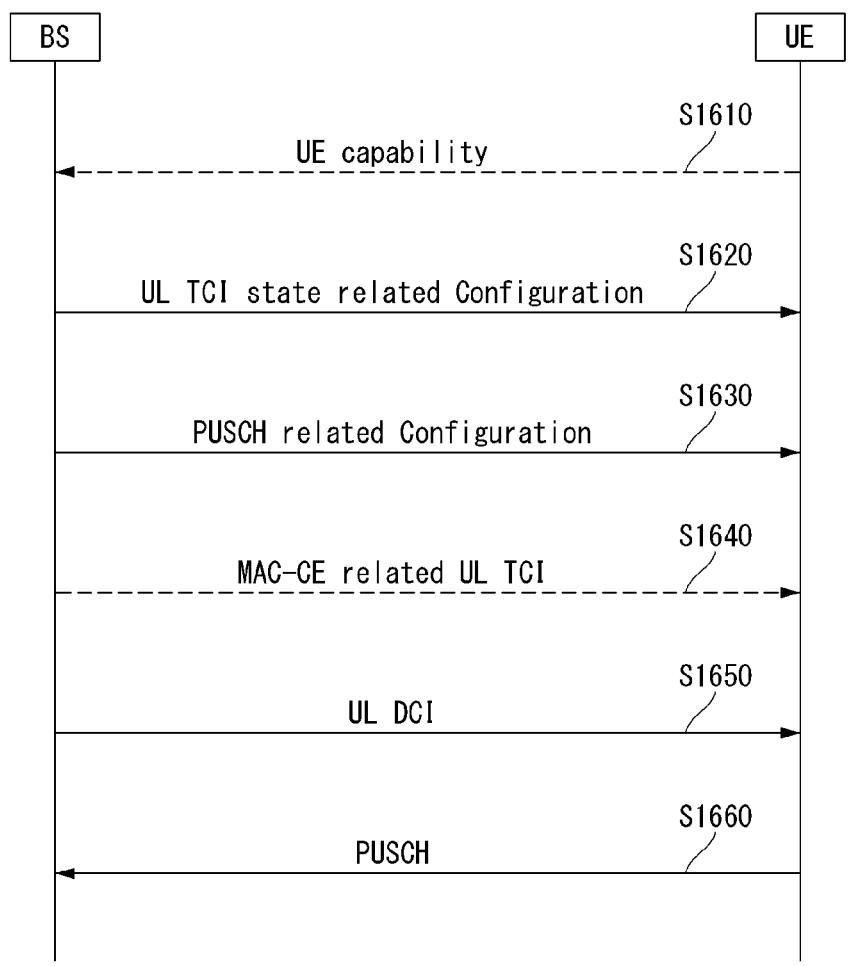

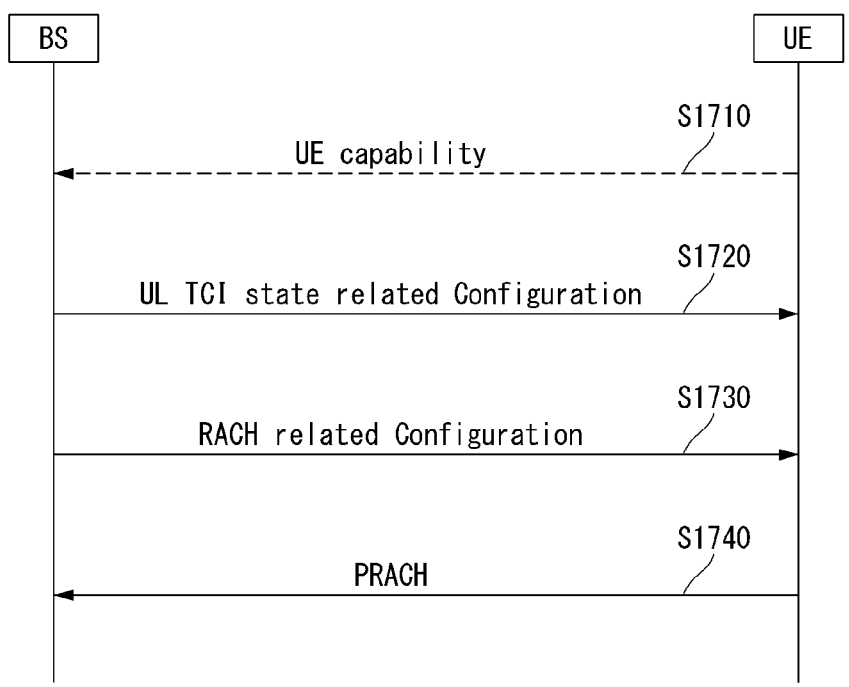
[FIG. 17]

[FIG. 18]
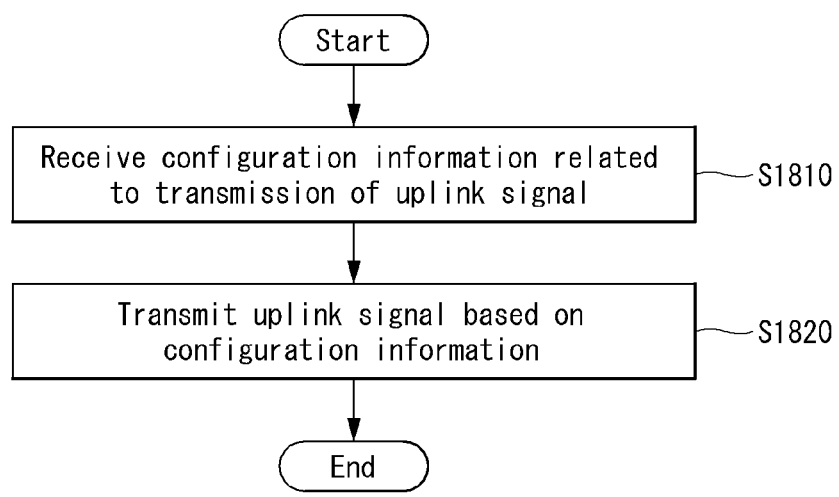

[FIG. 19]
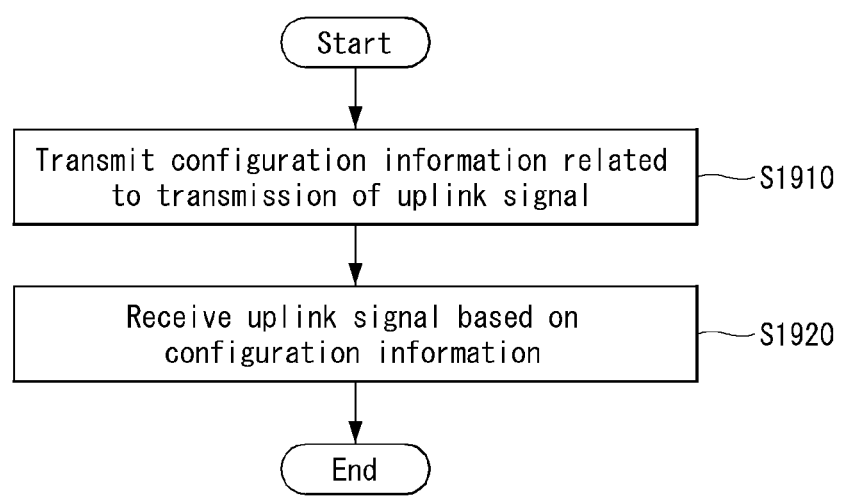

[FIG. 20]
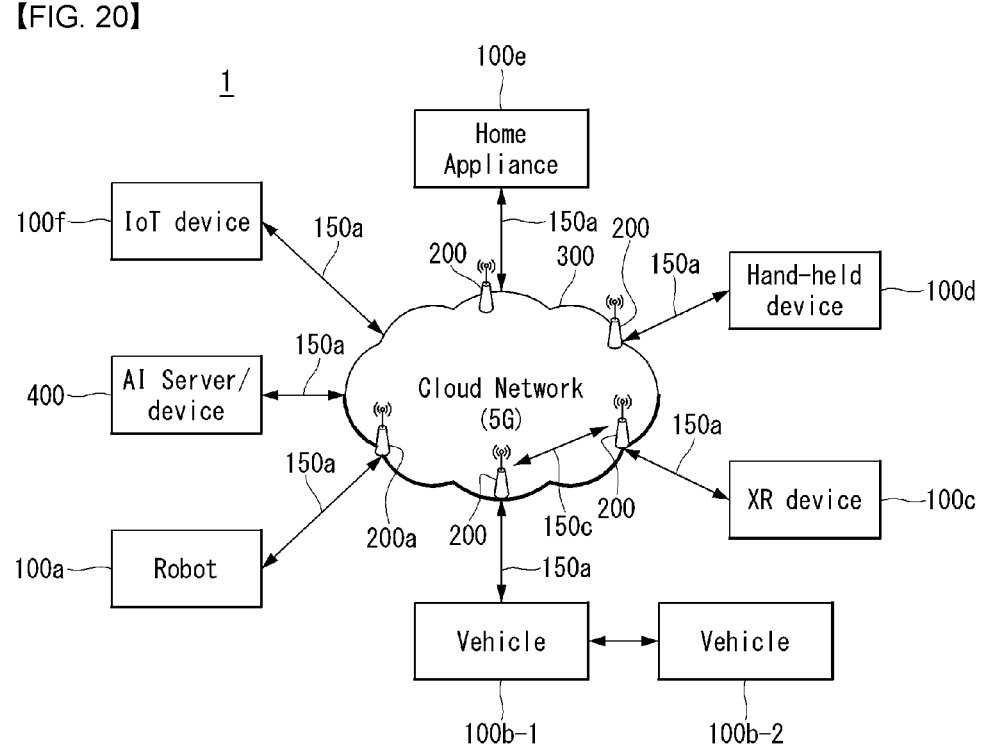

[FIG. 21]
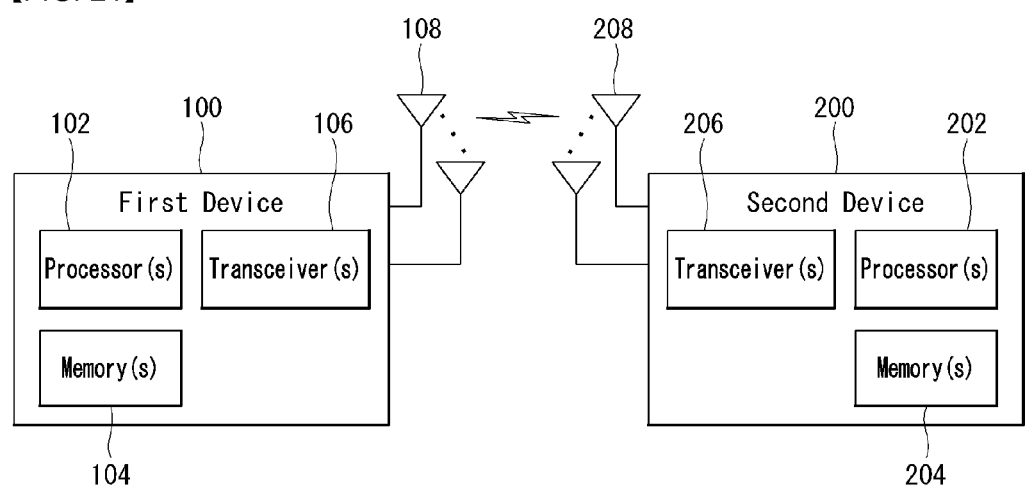

[FIG. 22]
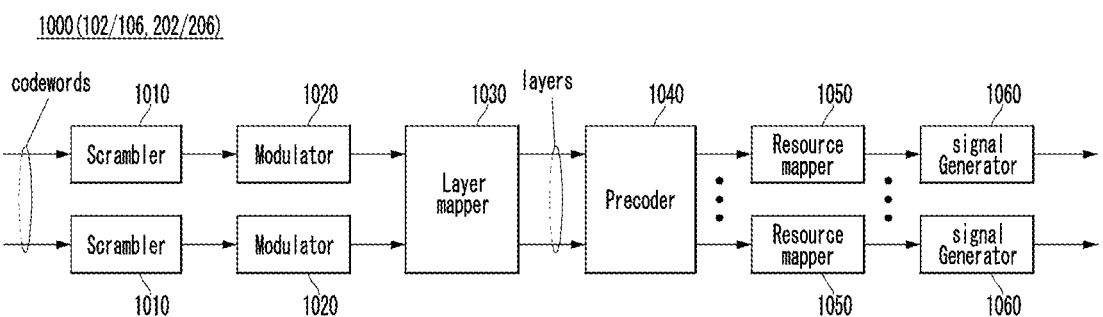

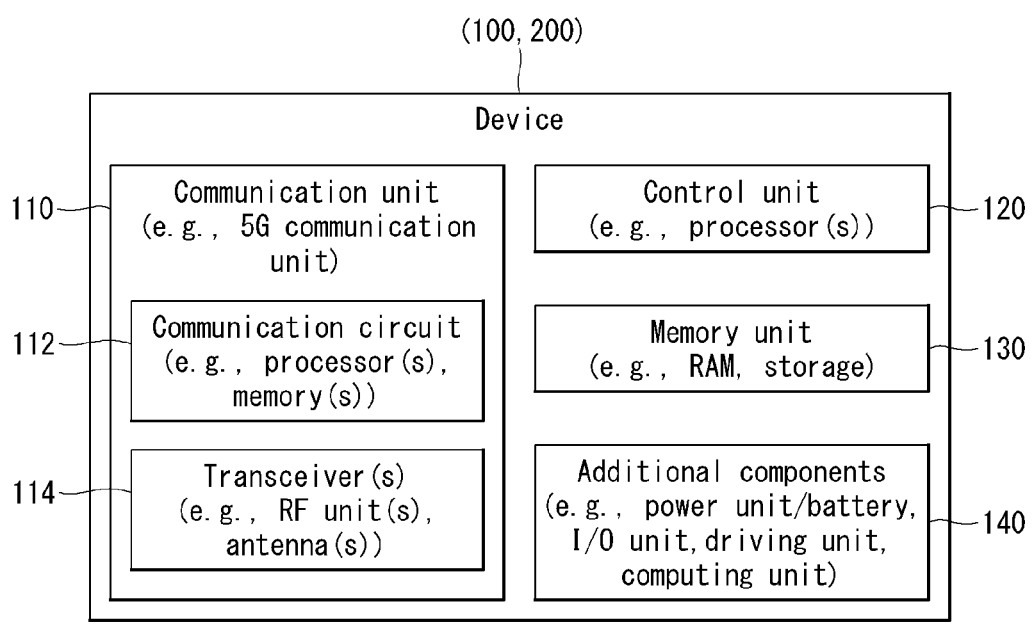
[FIG. 23]

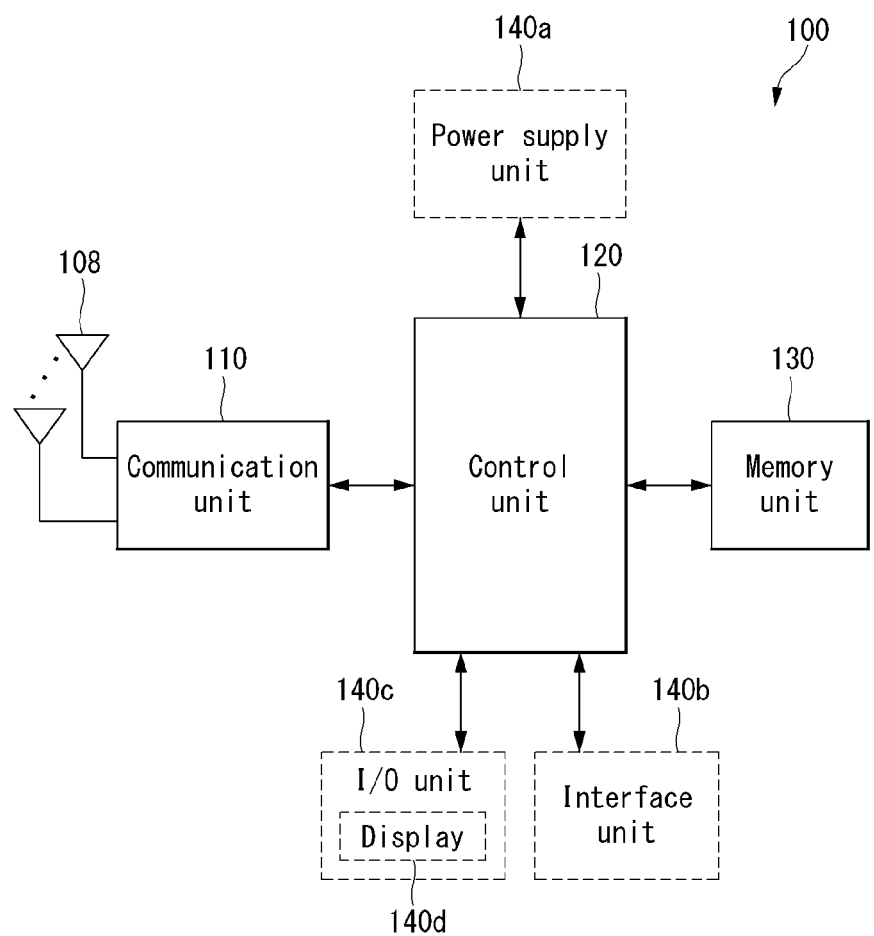

METHOD FOR TRANSMITTING AND RECEIVING UPLINK SIGNAL IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2020/007262, filed on Jun. 4, 2020, which claims the benefit of U.S. Provisional Application No. 62/857,786, filed on Jun. 5, 2019, the contents of which are all hereby incorporated by reference herein in their entirety.

TECHNICAL FIELD

The present disclosure relates to a method for transmitting and receiving uplink signal in wireless communication system, and device therefor.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DISCLOSURE

Technical Problem

The present disclosure proposes a method for transmitting an uplink signal.

Specifically, the present disclosure proposes a method capable of providing an integrated configuration in transmitting the uplink signal.

Furthermore, the present disclosure proposes a method capable of providing an uplink transmission configuration by considering a flexibility of an operation of a capability of a UE.

Furthermore, the present disclosure proposes a transmission method capable of utilizing an existing scheme when the uplink signal is based on a Physical Uplink Shared Channel (PUSCH).

Furthermore, the present disclosure proposes an uplink transmission method considering a wireless situation for each panel.

The technical objects of the present disclosure are not limited to the aforementioned technical objects, and other technical objects, which are not mentioned above, will be apparently appreciated by a person having ordinary skill in the art from the following description.

Technical Solution

A method for transmitting, by a user equipment (UE), an uplink signal in a wireless communication system according to one embodiment of the present disclosure includes: receiving configuration information related to the transmission of the uplink signal; and transmitting the uplink signal based on the configuration information.

The configuration information includes a transmission configuration indicator (TCI) state. The TCI state is related to at least one of i) a panel ID indicating any one of a plurality of panels, ii) a reference RS related to a spatial domain filter for the transmission of the uplink signal, or iii) a type of the uplink signal.

Based on the TCI state in which at least one of the panel ID or the reference RS is not configured, the uplink signal is transmitted based on at least one of a specific panel or a specific spatial domain filter.

The specific spatial domain filter and the specific panel may be based on determination of the UE.

The uplink signal may be related to a specific usage.

The uplink signal may be based on a sounding reference signal (SRS) for beam management.

The specific panel may be changed based on a specific resource unit based on the TCI state in which the panel ID is not configured.

The specific resource unit may be based on adjacent SRS resources. The adjacent SRS resources may be related to at least one of 1) SRS resource ID arranged in a specific order, 2) a location of each SRS resource on a time domain, or 3) an angular domain of a spatial domain filter configured in each SRS resource.

The specific resource unit may be based on an SRS resource group including SRS resources related to the same panel.

The TCI state may be configured for each specific resource group including a plurality of uplink resources.

The plurality of uplink resources may be related to a common attribute.

The uplink signal may be based on a physical uplink shared channel (PUSCH), transmission of the PUSCH may be based on i) the TCI state and ii) an SRI field related to downlink control information (DCI) for scheduling the PUSCH, and a spatial domain filter for the transmission of the PUSCH may be determined based on the TCI state.

The transmission of the uplink signal may be based on i) the TCI state related to at least one of a plurality of reference RSs or a plurality of panel IDs or ii) a plurality of TCI states.

The TCI state may be related to at least one of 1) a UL power control related parameter for each panel ID, 2) a timing advance (TA) for each panel ID, or 3) mapping information between a Phase Tracking Reference Signal (PTRS) port related to the transmission of the uplink signal and the panel ID.

The UL power control related parameter for each panel ID may be based on the reference RS configured in the TCI state.

A UE transmitting an uplink signal in a wireless communication system according to another embodiment of the present disclosure includes: one or more transceivers; one or more processors controlling the one or more transceivers; and one or more memories operatively connectable to the one or more processors, and storing instructions of performing operations when the transmission of the uplink channel is executed by the one or more processors.

The operations include receiving configuration information related to the transmission of the uplink signal; and transmitting the uplink signal based on the configuration information.

The configuration information includes a transmission configuration indicator (TCI) state. The TCI state is related to at least one of i) a panel ID indicating any one of a plurality of panels, ii) a reference RS related to a spatial domain filter for the transmission of the uplink signal, or iii) a type of the uplink signal.

Based on the TCI state in which at least one of the panel ID or the reference RS is not configured, the uplink signal is transmitted based on at least one of a specific panel or a specific spatial domain filter.

A device according to yet another embodiment of the present disclosure includes one or more memories and one or more processors functionally connected to the one or more memories.

The one or more processors are configured to control the device to receive configuration information related to transmission of an uplink signal, and transmit the uplink signal based on the configuration information.

The configuration information includes a transmission configuration indicator (TCI) state. The TCI state is related to at least one of i) a panel ID indicating any one of a plurality of panels, ii) a reference RS related to a spatial domain filter for the transmission of the uplink signal, or iii) a type of the uplink signal.

Based on the TCI state in which at least one of the panel ID or the reference RS is not configured, the uplink signal is transmitted based on at least one of a specific panel or a specific spatial domain filter.

One or more non-transitory computer-readable media according to still yet another embodiment of the present disclosure store one or more instructions.

One or more instructions executable by one or more processors are configured to control a UE to receive configuration information related to transmission of an uplink signal, and transmit the uplink signal based on the configuration information.

The configuration information includes a transmission configuration indicator (TCI) state. The TCI state is related to at least one of i) a panel ID indicating any one of a plurality of panels, ii) a reference RS related to a spatial domain filter for the transmission of the uplink signal, or iii) a type of the uplink signal.

Based on the TCI state in which at least one of the panel ID or the reference RS is not configured, the uplink signal is transmitted based on at least one of a specific panel or a specific spatial domain filter.

A method for receiving, by a base station (BS), an uplink signal in a wireless communication system according to still yet another embodiment of the present disclosure includes: transmitting configuration information related to transmission of the uplink signal; and receiving the uplink signal based on the configuration information.

The configuration information includes a transmission configuration indicator (TCI) state. The TCI state is related to at least one of i) a panel ID indicating any one of a plurality of panels, ii) a reference RS related to a spatial domain filter for the transmission of the uplink signal, or iii) a type of the uplink signal.

Based on the TCI state in which at least one of the panel ID or the reference RS is not configured, the uplink signal is transmitted based on at least one of a specific panel or a specific spatial domain filter.

A BS receiving uplink signal in a wireless communication system according to still yet another embodiment of the present disclosure includes: one or more transceivers; one or more processors controlling the one or more transceivers; and one or more memories operatively connectable to the one or more processors, and storing instructions of performing operations when the transmission of the uplink channel is executed by the one or more processors.

The operations include transmitting configuration information related to transmission of the uplink signal; and receiving the uplink signal based on the configuration information.

The configuration information includes a transmission configuration indicator (TCI) state. The TCI state is related to at least one of i) a panel ID indicating any one of a plurality of panels, ii) a reference RS related to a spatial domain filter for the transmission of the uplink signal, or iii) a type of the uplink signal.

Based on the TCI state in which at least one of the panel ID or the reference RS is not configured, the uplink signal is transmitted based on at least one of a specific panel or a specific spatial domain filter.

Advantageous Effects

According to an embodiment of the present disclosure, an uplink signal is transmitted based on configuration information including a Transmission Configuration Indicator (TCI) state. The TCI state is related to at least one of i) a penal ID indicating any one of a plurality of panels, ii) a reference RS related to a spatial domain filter for the transmission of the uplink, or iii) the type of uplink signal.

The integrated configuration can be provided for all types of uplink signal transmission through the embodiment as described above, so signaling overhead and a delay are reduced as compared with a case where transmission configuration related signaling is performed for each type of uplink signal.

According to an embodiment of the present disclosure, the uplink signal may be related to a specific usage. Specifically, the uplink signal may be based on a sounding reference signal (SRS) for beam management. The uplink signal may be transmitted based on a specific panel and/or a specific spatial domain filter, according to the TCI state in which the panel ID and/or the reference RS is not configured.

Accordingly, 1) since a flexibility of a UE behavior related to determination of a panel/beam is improved, the transmission of the uplink signal may be performed so as to be more suitable for a UE capability. 2) The beam management may be performed based on a preference beam/panel combination determined by the UE, so latency and overhead are reduced as compared with a case where beam sweeping is performed based on all panels. 3) A case where the preference beam/panel combination determined by the UE is utilized is limited to a specific uplink channel to prevent ambiguity on the UE behavior.

According to an embodiment of the present disclosure, the specific panel is changed based on a specific resource unit based on the TCI state in which the panel ID is not configured.

As an example, the specific resource unit is based on contiguous SRS resources. The contiguous SRS resources may be related to 1) SRS resource ID arranged in a specific order, 2) a location of each SRS resource in a time domain, 3) an angular domain of a spatial domain filter configured in each SRS resource, and at least one of 1), 2), or 3).

Accordingly, contiguous SRS resources related to a panel change are specifically limited to more effectively perform the beam sweeping.

As another example, the specific resource unit may be based on an SRS resource group including SRS resources related to the same panel. Accordingly, the number of panel switching times is reduced as compared with a case where the panel is changed for each SRS resource, so the latency according to a panel switching delay is reduced and a guard period is reduced, and as a result, wasted resources may be reduced.

According to an embodiment of the present disclosure, the TCI state may be configured for each specific resource group including a plurality of uplink resources. The plurality of uplink resources is related to a common attribute. The TCI state is configured for each specific resource group constituted by resources having the common attribute, so the overhead is reduced and the flexibility of the TCI state configuration is increased as compared with a case where the TCI state is configured for each resource.

According to an embodiment of the present disclosure, the uplink signal may be based on a physical uplink shared channel (PUSCH). Transmission of the PUSCH is based on i) the TCI state and ii) an SRI field related to downlink control information (DCI) for scheduling the PUSCH. A spatial domain filter for the transmission of the PUSCH is determined based on the TCI state. Accordingly, in the case of the transmission of the PUSCH, an existing SRI field indicating the beam may be utilized to indicate a rank, a precoder, etc., by complementing the TCI state.

According to an embodiment of the present disclosure, the transmission of the uplink signal may be based on the TCI state related to at least one of a plurality of reference RSs or a plurality of panel IDs or ii) a plurality of TCI states. Accordingly, a simultaneous transmission across multi-panel (STxMP) behavior through multi-panels of the corresponding UE may be effectively supported through the TCI state.

According to an embodiment of the present disclosure, the TCI state may be related to at least one of 1) a UL power control related parameter for each panel ID, 2) a timing advance (TA) for each panel ID, or 3) mapping information between a port of a phase tracking reference signal (PTRS) related to the transmission of the uplink signal and the panel ID. Accordingly, the uplink signal may be transmitted based on a wireless channel situation for each channel, so reliability is enhanced.

A pathloss value or a reference signal received power (RSRP) value may vary when previously receiving a corresponding DL RS according to a reference RS is an SSB-RI or a CRI. According to an embodiment of the present disclosure, the UL power control related parameter for each panel ID may be based on the reference RS configured in the TCI state. Accordingly, a power control may be performed so as to transmit the uplink signal with a quality which is the same as a quality according to the reference RS of the TCI state.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure is applicable.

FIG. 2 illustrates a relationship between an uplink frame and a downlink frame in a wireless communication system to which a method proposed by the present disclosure is applicable.

FIG. 3 illustrates an example of a frame structure in an NR system.

FIG. 4 illustrates an example of a resource grid supported by a wireless communication system to which a method proposed in the present disclosure is applicable.

FIG. 5 illustrates examples of a resource grid for each antenna port and numerology to which a method proposed in the present disclosure is applicable.

FIG. 6 illustrates physical channels and general signal transmission used in a 3GPP system.

FIG. 7 illustrates an example of beamforming using SSB and CSI-RS.

FIG. 8 illustrates an example of a UL BM procedure using an SRS.

FIG. 9 is a flowchart showing an example of a UL BM procedure using the SRS.

FIG. 10 is a flowchart illustrating an example of a DL PTRS procedure.

FIG. 11 is a flowchart showing an example of an uplink transmission/reception operation to which a method proposed in the present disclosure may be applied.

FIG. 12 and FIG. 13 illustrate an example of multi-panel based on an RF switch applied to the disclosure.

FIG. 14 illustrates a PUCCH transmission procedure to which a method proposed in the present disclosure is applied.

FIG. 15 illustrates an SRS transmission procedure to which a method proposed in the present disclosure is applied.

FIG. 16 illustrates a PUSCH transmission procedure to which a method proposed in the present disclosure is applied.

FIG. 17 illustrates a PRACH transmission procedure to which a method proposed in the present disclosure is applied.

FIG. 18 is a flowchart for describing a method of transmitting, by a UE, an uplink signal in a wireless communication system according to an embodiment of the present disclosure.

FIG. 19 is a flowchart for describing a method of receiving, by a BS, an uplink channel in a wireless communication system according to another embodiment of the present disclosure.

FIG. 20 illustrates a communication system 1 applied to the present disclosure.

FIG. 21 illustrates wireless devices applicable to the present disclosure.

FIG. 22 illustrates a signal process circuit for a transmission signal.

FIG. 23 illustrates another example of a wireless device applied to the present disclosure.

FIG. 24 illustrates a hand-held device applied to the present disclosure.

MODE FOR INVENTION

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referenced.

3GPP LTE
  36.211: Physical channels and modulation
  36.212: Multiplexing and channel coding
  36.213: Physical layer procedures
  36.300: Overall description
  36.331: Radio Resource Control (RRC)

3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies can be defined.

DEFINITION OF TERMS eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, μ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |

TABLE 1-continued

| μ | $\Delta f = 2^\mu \cdot 15$ [kHz] | Cyclic prefix |
|---|---|---|
| 3 | 120 | Normal |
| 4 | 240 | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

With regard to the frame structure in the NR system, the size of various fields in the time domain is expressed as a multiple of time unit of $T_s=1/(\Delta f_{max} \cdot N_f)$, where $\Delta f_{max}=480 \cdot 10^3$, and $N_f=4096$. Downlink and uplink transmissions is constituted of a radio frame with a period of $T_f=(\Delta f_{max} N_f/100) \cdot T_s=10$ ms. Here, the radio frame is constituted of 10 subframes each of which has a period of $T_{sf}=(\Delta f_{max} N_f/1000) \cdot T_s=1$ ms. In this case, one set of frames for uplink and one set of frames for downlink may exist.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA}=N_{TA}T_s$ earlier than the start of the downlink frame by the UE.

For numerology μ, slots are numbered in ascending order of $n_s^\mu \in \{0, \ldots, N_{subframe}^{slots,\mu}-1\}$ in the subframe and in ascending order of $n_{s,f}^\mu \in \{0, \ldots, N_{frame}^{slots,\mu}-1\}$ in the radio frame. One slot includes consecutive OFDM symbols of $N_{symb}^\mu$, and $N_{symb}^\mu$ is determined according to the used numerology and slot configuration. In the subframe, the start of slot $n_s^\mu$ is temporally aligned with the start of $n_s^\mu N_{symb}^\mu$.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| 4 | 14 | 160 | 16 |

TABLE 4

| 2 | 12 | 40 | 4 |
| --- | --- | --- | --- |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^\mu N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l̄), where k=0, . . . , $N_{RB}^\mu N_{sc}^{RB}-1$ is an index on a frequency domain, and l̄=0, . . . , $2^\mu N_{symb}^{(\mu)}-1$ refers to a location of a symbol in a subframe. The index pair (k, l̄) is used to refer to a resource element in a slot, where l=0, . . . , $N_{symb}^\mu-1$.

The resource element (k,l̄) for the numerology μ and the antenna port p corresponds to a complex value $a_{k,\bar{l}}^{(p,\mu)}$. When there is no risk for confusion or when a specific antenna port or numerology is not specified, the indexes p and μ may be dropped, and as a result, the complex value may be $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2.

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^\mu$ in the frequency domain and resource elements (k, l) for the subcarrier spacing configuration μ may be given by the following Equation 1.

$$n_{CRB}^\mu = \left\lfloor \frac{k}{N_{sc}^{RB}} \right\rfloor \qquad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \qquad \text{[Equation 2]}$$

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

Downlink Beam Management (DL BM)

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 7 illustrates an example of beamforming using a SSB and a CSI-RS.

As illustrated in FIG. 7, a SSB beam and a CSI-RS beam may be used for beam measurement. A measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping using the SSB may be performed while the UE changes Rx beam for the same SSBRI across multiple SSB bursts. One SS burst includes one or more SSBs, and one SS burst set includes one or more SSB bursts.

DL BM Related Beam Indication

A UE may be RRC-configured with a list of up to M candidate transmission configuration indication (TCI) states at least for the purpose of quasi co-location (QCL) indication, where M may be 64.

Each TCI state may be configured with one RS set. Each ID of DL RS at least for the purpose of spatial QCL (QCL Type D) in an RS set may refer to one of DL RS types such as SSB, P-CSI RS, SP-CSI RS, A-CSI RS, etc.

Initialization/update of the ID of DL RS(s) in the RS set used at least for the purpose of spatial QCL may be performed at least via explicit signaling.

Table 5 represents an example of TCI-State IE.

The TCI-State IE associates one or two DL reference signals (RSs) with corresponding quasi co-location (QCL) types.

TABLE 5

-- TAG-TCI-STATE-STOP
-- ASN1STOP

In Table 5, bwp-Id parameter represents a DL BWP where the RS is located, cell parameter represents a carrier where the RS is located, and reference signal parameter represents reference antenna port(s) which is a source of quasi co-location for corresponding target antenna port(s) or a reference signal including the one. The target antenna port(s) may be CSI-RS, PDCCH DMRS, or PDSCH DMRS. As an example, in order to indicate QCL reference RS information on NZP CSI-RS, the corresponding TCI state ID may be indicated to NZP CSI-RS resource configuration information. As another example, in order to indicate QCL reference information on PDCCH DMRS antenna port(s), the TCI state ID may be indicated to each CORESET configuration. As another example, in order to indicate QCL reference information on PDSCH DMRS antenna port(s), the TCI state ID may be indicated via DCI.

Quasi-Co Location (QCL)

The antenna port is defined so that a channel over which a symbol on an antenna port is conveyed can be inferred from a channel over which another symbol on the same antenna port is conveyed. When properties of a channel over which a symbol on one antenna port is conveyed can be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

UL BM Procedure

A UL BM may be configured such that beam reciprocity (or beam correspondence) between Tx beam and Rx beam is established or not established depending on the UE implementation. If the beam reciprocity between Tx beam and Rx beam is established in both a base station and a UE, a UL beam pair may be adjusted via a DL beam pair. However, if the beam reciprocity between Tx beam and Rx beam is not established in any one of the base station and the UE, a process for determining the UL beam pair is necessary separately from determining the DL beam pair.

Even when both the base station and the UE maintain the beam correspondence, the base station may use a UL BM procedure for determining the DL Tx beam even if the UE does not request a report of a (preferred) beam.

The UM BM may be performed via beamformed UL SRS transmission, and whether to apply UL BM of a SRS resource set is configured by the (higher layer parameter) usage. If the usage is set to 'BeamManagement (BM)', only one SRS resource may be transmitted to each of a plurality of SRS resource sets in a given time instant.

The UE may be configured with one or more sounding reference symbol (SRS) resource sets configured by (higher layer parameter) SRS-ResourceSet (via higher layer signaling, RRC signaling, etc.). For each SRS resource set, the UE may be configured with K≥1 SRS resources (higher later parameter SRS-resource), where K is a natural number, and a maximum value of K is indicated by SRS_capability.

In the same manner as the DL BM, the UL BM procedure may be divided into a UE's Tx beam sweeping and a base station's Rx beam sweeping.

FIG. 8 illustrates an example of an UL BM procedure using a SRS.

More specifically, (a) of FIG. 8 illustrates an Rx beam determination procedure of a base station, and (a) of FIG. 8 illustrates a Tx beam sweeping procedure of a UE.

FIG. 9 is a flow chart illustrating an example of an UL BM procedure using a SRS.

The UE receives, from the base station, RRC signaling (e.g., SRS-Config IE) including (higher layer parameter) usage parameter set to 'beam management' in S910.

Table 6 represents an example of SRS-Config information element (IE), and the SRS-Config IE is used for SRS transmission configuration. The SRS-Config IE contains a list of SRS-Resources and a list of SRS-Resource sets. Each SRS resource set means a set of SRS resources.

The network may trigger transmission of the SRS resource set using configured aperiodicSRS-ResourceTrigger (L1 DCI).

TABLE 6

| SRS-ResourceId ::= | INTEGER (0..maxNrofSRS-Resources−1) |
| --- | --- |

In Table 6, usage refers to a higher layer parameter to indicate whether the SRS resource set is used for beam management or is used for codebook based or non-codebook based transmission. The usage parameter corresponds to L1 parameter 'SRS-SetUse'. 'spatialRelationInfo' is a parameter representing a configuration of spatial relation between a reference RS and a target SRS. The reference RS may be SSB, CSI-RS, or SRS which corresponds to L1 parameter 'SRS-SpatialRelationInfo'. The usage is configured per SRS resource set.

The UE determines the Tx beam for the SRS resource to be transmitted based on SRS-SpatialRelation Info contained in the SRS-Config IE in S920. The SRS-SpatialRelation Info is configured per SRS resource and indicates whether to apply the same beam as the beam used for SSB, CSI-RS, or SRS per SRS resource. Further, SRS-SpatialRelationInfo may be configured or not configured in each SRS resource.

If the SRS-SpatialRelationInfo is configured in the SRS resource, the same beam as the beam used for SSB, CSI-RS or SRS is applied for transmission. However, if the SRS-SpatialRelationInfo is not configured in the SRS resource, the UE randomly determines the Tx beam and transmits the SRS via the determined Tx beam in S930.

More specifically, for P-SRS with 'SRS-ResourceConfigType' set to 'periodic':

i) if SRS-SpatialRelationInfo is set to 'SSB/PBCH,' the UE transmits the corresponding SRS resource with the same spatial domain transmission filter (or generated from the corresponding filter) as the spatial domain Rx filter used for the reception of the SSB/PBCH; or ii) if SRS-SpatialRelationInfo is set to 'CSI-RS,' the UE transmits the SRS resource with the same spatial domain transmission filter used for the reception of the periodic CSI-RS or SP CSI-RS; or iii) if SRS-SpatialRelationInfo is set to 'SRS,' the UE transmits the SRS resource with the same spatial domain transmission filter used for the transmission of the periodic SRS.

Even if 'SRS-ResourceConfigType' is set to 'SP-SRS' or 'AP-SRS,' the beam determination and transmission operations may be applied similar to the above.

Additionally, the UE may receive or may not receive feedback for the SRS from the base station, as in the following three cases in S940.

i) If Spatial_Relation_Info is configured for all the SRS resources within the SRS resource set, the UE transmits the SRS with the beam indicated by the base station. For example, if the Spatial_Relation_Info indicates all the same SSB, CRI, or SRI, the UE repeatedly transmits the SRS with the same beam. This case corresponds to (a) of FIG. 8 as the usage for the base station to select the Rx beam.

ii) The Spatial_Relation_Info may not be configured for all the SRS resources within the SRS resource set. In this case, the UE may perform transmission while freely changing SRS beams. That is, this case corresponds to (b) of FIG. 8 as the usage for the UE to sweep the Tx beam.

iii) The Spatial_Relation_Info may be configured for only some SRS resources within the SRS resource set. In this case, the UE may transmit the configured SRS resources with the indicated beam, and transmit the SRS resources, for which Spatial_Relation_Info is not configured, by randomly applying the Tx beam.

Hereinafter, a matter related to a phase tracking reference signal (PTRS) will be described in detail.

Phase Tracking Reference Signal (PTRS)

In the case of mmWave, since an influence of phase noise is large due to damaged to RF hardware, a transmitted or received signal is distorted in a time domain.

The phase noise causes common phase error (CPE) and inter-carrier interference (ICI) in the frequency domain.

In particular, compensation of oscillator phase noise is enabled in a high carrier frequency, and the same phase rotation for all subcarriers occurs by the phase noise. Accordingly, the PTRS is defined in the NR in order to estimate and compensate the CPE.

DL PTRS Related Operation

FIG. 10 is a flowchart illustrating an example of a DL PTRS procedure.

The base station transmits PTRS configuration information to the UE (S1010).

The PTRS configuration information may refer to PTRS-DownlinkConfig IE.

The PTRS-DownlinkConfig IE may include a frequencyDensity parameter, a timeDensity parameter, an epre-Ratio parameter, a resourceElementOffset parameter, etc.

The frequencyDensity parameter is a parameter representing the presence and frequency density of a DL PTRS as a function of the scheduled BW.

The timeDensity parameter is a parameter representing the presence and time density of the DL PTRS as a function of a modulation and coding scheme (MCS).

The epre-Ratio parameter is a parameter indicating an energy per resource element (EPRE) between PTRS and PDSCH.

Next, the base station generates a sequence used for PTRS (S1020).

The sequence for the PTRS is generated using the DMRS sequence of the same subcarrier as shown in Equation 3 below.

Sequence generation for PTRS may be defined differently depending on whether transform precoding is enabled or not, and Equation 3 below shows an example of a case in which transform precoding is disabled.

$$r_k = r(2m + k')$$ [Equation 3]

where $r(2m+k')$ is a DMRS given at position $l_0$ and subcarrier k.

That is, the PTRS sequence uses the DMRS sequence, but more specifically, the PTRS sequence in subcarrier k is the same as the DMRS sequence in subcarrier k.

Next, the base station maps the generated sequence to a resource element (S1030).

Here, the resource element may include at least one of time, frequency, antenna port, or code.

The position of the PTRS in the time domain is mapped at a specific symbol interval, starting from the start symbol of PDSCH allocation. If a DMRS symbol exists, mapping is performed from a symbol following the corresponding DMRS symbol. The specific symbol interval may be 1, 2 or 4 symbols.

And, in relation to the resource element mapping of PTRS, the frequency position of the PTRS is determined by the frequency position of the associated DMRS port and the higher layer parameter UL-PTRS-RE-offset.

Here, the UL-PTRS-RE-offset is included in the PTRS configuration, and indicates a subcarrier offset for UL PTRS for CP-OFDM.

For DL, the PTRS port is associated with the DMRS port of the lowest index among the scheduled DMRS ports.

And, for UL, the base station configures which DMRS port is associated with the PTRS port through UL DCI.

Next, the base station transmits the PTRS to the UE on the resource element (S1040). The UE compensates for the phase noise using the received PTRS.

UL PTRS Related Operation

The UL PTRS-related operation is similar to the above-described UL PTRS-related operation, and the names of parameters related to DL may be replaced with the names of parameters related to UL.

That is, the PTRS-DownlinkConfig IE may be replaced with a PTRS-UplinkConfig IE, and in a DL PTRS-related operation, the base station may be replaced with the UE, and the UE may be replaced with the base station.

Likewise, sequence generation for PTRS may be defined differently depending on whether transform precoding is enabled or not.

FIG. 11 is a flowchart showing an example of an uplink transmission/reception operation to which a method proposed in the present disclosure may be applied.

Referring to FIG. 11, the eNB schedules uplink transmission such as the frequency/time resource, the transport layer, an uplink precoder, the MCS, etc., (S1110). In particular, the eNB may determine a beam for PUSCH transmission of the UE through the aforementioned operations.

The UE receives DCI for downlink scheduling (i.e., including scheduling information of the PUSCH) on the PDCCH (S1120).

DCI format 0_0 or 0_1 may be used for the uplink scheduling and in particular, DCI format 0_1 includes the following information.

Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator.

In particular, configured SRS resources in an SRS resource set associated with higher layer parameter 'usage' may be indicated by an SRS resource indicator field. Further, 'spatialRelationInfo' may be configured for each SRS resource and a value of 'spatialRelationInfo' may be one of {CRI, SSB, and SRI}.

The UE transmits the uplink data to the eNB on the PUSCH (S1130).

When the UE detects a PDCCH including DCI format 0_0 or 0_1, the UE transmits the corresponding PUSCH according to the indication by the corresponding DCI.

Two transmission schemes, i.e., codebook based transmission and non-codebook based transmission are supported for PUSCH transmission:

i) When higher layer parameter txConfig' is set to 'codebook', the UE is configured to the codebook based transmission. On the contrary, when higher layer parameter txConfig' is set to 'nonCodebook', the UE is configured to the non-codebook based transmission. When higher layer parameter 'txConfig' is not configured, the UE does not predict that the PUSCH is scheduled by DCI format 0_1. When the PUSCH is scheduled by DCI format 0_0, the PUSCH transmission is based on a single antenna port.

In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter 'nrofSRS-Ports'.

When higher layer parameter 'txConfig' set to 'codebook' is configured for the UE, at least one SRS resource is configured in the UE. An SRI indicated in slot n is associated with most recent transmission of the SRS resource identified by the SRI and here, the SRS resource precedes PDCCH (i.e., slot n) carrying the SRI.

ii) In the case of the non-codebook based transmission, the PUSCH may be scheduled by DCI format 0_0, DCI format 0_1, or semi-statically. When multiple SRS resources are configured, the UE may determine the PUSCH precoder and the transmission rank based on a wideband SRI and here, the SRI is given by the SRS resource indicator in the DCI or given by higher layer parameter 'srs-ResourceIndicator'. The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter 'usage' set to 'nonCodebook'. The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

Hereinafter, matters related to the definition of a panel in the present disclosure will be described in detail.

A "panel" referred to in the present disclosure may be based on at least one of the following definitions.

According to an embodiment, the "panel" may be interpreted/applied by being transformed into "one panel or a plurality of panels" or a "panel group". The panel may be related to a specific characteristic (e.g., a timing advance (TA), a power control parameter, etc.). The plurality of panels may be panels having a similarity/common value in terms of the specific characteristic.

According to an embodiment, a "panel" may be interpreted/applied by being transformed into "one antenna port or a plurality of antenna ports", "one uplink resource or a plurality of uplink resources", an "antenna port group" or an "uplink resource group (or set)". The antenna port or the uplink resource may be related to a specific characteristic (e.g., a timing advance (TA), a power control parameter, etc.). The plurality of antenna ports (uplink resources) may be antenna ports (uplink resources) having a similarity/common value in terms of the specific characteristic.

According to an embodiment, a "panel" may be interpreted/applied by being transformed into "one beam or a plurality of beams" or "at least one beam group (or set)". The beam (beam group) may be related to a specific characteristic (e.g., a timing advance (TA), a power control parameter, etc.). The plurality of beams (beam groups) may be beams (beam groups) having a similarity/common value in terms of the specific characteristic.

According to an embodiment, a "panel" may be defined as a unit for a UE to configure a transmission/reception beam. For example, a "transmission panel (Tx panel)" may be defined as a unit in which a plurality of candidate transmission beams can be generated by one panel, but only one of the beams can be used for transmission at a specific time (that is, only one transmission beam (spatial relation information RS) can be used per Tx panel in order to transmit a specific uplink signal/channel).

According to an embodiment, a "panel" may refer to "a plurality antenna ports (or at least one antenna port)", a "antenna port group" or an "uplink resource group (or set)" with common/similar uplink synchronization. Here, the "panel" may be interpreted/applied by being transformed into a generalized expression of "uplink synchronization unit (USU)". Alternatively, the "panel" may be interpreted/applied by being transformed into a generalized expression of "uplink transmission entity (UTE)".

Additionally, the "uplink resource (or resource group)" may be interpreted/applied by being transformed into a resource (or a resource group (set)) of a physical uplink shared channel (PUSCH)/physical uplink control channel (PUCCH)/sounding reference signal (SRS)/physical random access channel (PRACH). Conversely, a resource (resource group) of a PUSCH/PUCCH/SRS/PRACH may be interpreted/applied as an "uplink resource (or resource group)" based on the definition of the panel.

In the present disclosure, an "antenna (or antenna port)" may represent a physical or logical antenna (or antenna port).

As described above, a "panel" referred to in the present disclosure can be interpreted in various ways as "a group of UE antenna elements", "a group of UE antenna ports", "a group of logical antennas", and the like. Which physical/logical antennas or antenna ports are mapped to one panel may be variously changed according to position/distance/correlation between antennas, an RF configuration and/or an antenna (port) virtualization method. The phaming process may vary according to a UE implementation method.

In addition, the "panel" referred to in the present disclosure may be interpreted/applied by being transformed into "a plurality of panels" or a "panel group" (having similarity in terms of specific characteristics).

Hereinafter, matters related to implementation of a multi-panel will be described.

In the implementation of a UE in a high frequency band, modeling of a UE having a plurality of panels consisting of one or a plurality of antennas is being considered (e.g., bi-directional two panels in 3GPP UE antenna modeling). Various forms may be considered in implementing such a multi-panel. This is described below in detail with reference to FIGS. 11 and 12.

FIG. 12 and FIG. 13 illustrate an example of multi-panel based on an RF switch applied to the disclosure.

A plurality of panels may be implemented based on an RF switch.

Referring to FIG. 12, only one panel may be activated at a time, and signal transmission may be impossible for a predetermined time during which the activated panel is changed (i.e., panel switching).

FIG. 13 illustrates a plurality of panels according to different implementation schemes. Each panel may have an RF chain connected thereto so that it may be activated at any time. In this case, the time taken for panel switching may be zero or very short, and depending on the modem and power amplifier configuration, multiple panels may be simultaneously activated to transmit signals simultaneously (STxMP: simultaneous transmission across multi-panel).

In a UE having a plurality of panels described above, the radio channel state may be different for each panel, and the RF/antenna configuration may be different for each panel. Therefore, a method for estimating a channel for each panel is required. In particular, 1) to measure uplink quality or manage uplink beams or 2) to measure downlink quality for each panel or manage downlink beams using channel reciprocity, the following procedure is required.

A procedure for transmitting one or a plurality of SRS resources for each panel (here, the plurality of SRS resources may be SRS resources transmitted on different beams within one panel or SRS resources repeatedly transmitted on the same beam).

For convenience of description below, a set of SRS resources transmitted based on the same usage and the same time domain behavior in the same panel is referred to as an SRS resource group. The usage may include at least one of beam management, antenna switching, codebook-based PUSCH, or non-codebook based PUSCH. The time-domain behavior may be an operation based on any one of aperiodic, semi-persistent, and periodic.

The SRS resource group may use the configuration for the SRS resource set supported in the Rel-15 NR system, as it is, or separately from the SRS resource set, one or more SRS resources (based on the same usage and time-domain behavior) may be configured as the SRS resource group. In relation to the same usage and time-domain behavior, in the case of Rel-15, a plurality of SRS resource sets may be configured only when the corresponding usage is beam management. It is defined that simultaneous transmission is impossible between SRS resources configured in the same SRS resource set, but simultaneous transmission is possible between the SRS resources belonging to different SRS resource sets.

When considering the panel implementation scheme and multi-panel simultaneous transmission as shown in FIG. 13, the concept described above in connection with the SRS resource set may be directly applied to the SRS resource group. When considering panel switching according to the panel implementation scheme according to FIG. 12, an SRS resource group may be defined separately from the SRS resource set.

For example, a specific ID may be assigned to each SRS resource such that resources having the same ID belong to the same SRS resource group (SRS resource group) and resources having different IDs belong to different resource groups.

For example, when four SRS resource sets (e.g., RRC parameter usage is configured to 'BeamManagement') configured for a beam management (BM) usage are configured to the UE, each SRS resource set may be configured and/or defined to correspond to each panel of the UE. As an example, when four SRS resource sets are represented by SRS resource sets A, B, C, and D, and the UE implements a total of four (transmission) panels, each SRS resource set corresponds to one (transmission) panel to perform the SRS transmission.

As an example, implementation of the UE shown in Table 7 may be possible.

TABLE 7

| Maximum number of SRS reousrce sets across all time domain behavior (periodic/semi-persistent/aperiodic) | Additional constraint on the maximum of SRS resource sets per supported time domain behavior (periodic/semi-persistent/aperiodic) |
|---|---|
| 1 | 1 |
| 2 | 1 |
| 3 | 1 |
| 4 | 2 |
| 5 | 2 |
| 6 | 2 |
| 7 | 4 |
| 8 | 4 |

Referring to contents of Table 7, when the UE reports (or transmits), to the BS, UE capability information in which the number of SRS resource sets which may be supported by the UE itself is 7 or 8, the corresponding UE may be configured with up to a total of four SRS resource sets (for the BM usage) from the BS. In this case, as an example, the UE may also be defined, configured, and/or indicated to perform uplink transmission by making each of the SRS resource sets (for the BM usage) correspond to each panel (transmission panel and/or reception panel) of the UE. That is, an SRS resource set(s) for a specific usage (e.g., BM usage) configured to the UE may be defined, configured, and/or indicated to correspond to the panel of the UE. As an example, when the BS (implicitly or explicitly) configures and/or indicates, to the UE, a first SRS resource set in relation to the uplink transmission (configured for the BM usage), the corresponding UE may recognize to perform the uplink transmission by using a panel related (or corresponding) to the first SRS resource set.

Further, like the UE, when the UE that supports four panels transmits each panel to correspond to one SRS resource set for the BM usage, information on the number of SRS resources configurable per SRS resource set may also be include in the capability information of the UE. Here, the number of SRS resources may correspond to the number of transmittable beams (e.g., uplink beams) per panel of the UE. For example, the UE in which four panels are implemented may be configured to perform the uplink transmission in such a manner that two uplink beams correspond to two configured RS resources, respectively for each panel.

With respect to multi-panel transmission, UE category information may be defined in order for a UE to report performance information thereof related to multi-panel transmission. As an example, three multi-panel UE (MPUE) categories may be defined, and the MPUE categories may be classified according to whether a plurality of panels can be activated and/or whether transmission using a plurality of panels is possible.

In the case of the first MPUE category (MPUE category 1), in a UE in which multiple panels are implemented, only one panel may be activated at a time, and a delay for panel switching and/or activation may be set to [X]ms. For example, the delay may be set to be longer than a delay for beam switching/activation and may be set in units of symbols or slots.

In the case of the second MPUE category (MPUE category 2), in a UE in which multiple panels are implemented, multiple panels may be activated at a time, and one or more panels may be used for transmission. That is, simultaneous transmission using panels may be possible in the second MPUE category.

In the case of the third MPUE category (MPUE category 3), in a UE in which multiple panels are implemented, multiple panels may be activated at a time, but only one panel may be used for transmission.

With respect to multi-panel-based signal and/or channel transmission/reception proposed in the present disclosure, at least one of the three MPUE categories described above may be supported. For example, in Rel-16, MPUE category 3 among the following three MPUE categories may be (optionally) supported.

In addition, information on an MPUE category may be predefined on the standards or semi-statically configured according to a situation in a system (i.e., a network side or a UE side) and/or dynamically indicated. In this case, configuration/indication related to multi-panel-based signal and/or channel transmission/reception may be performed in consideration of the MPUE category.

Hereinafter, matters related to configuration/indication related to panel-specific transmission/reception will be described.

With respect to a multi-panel-based operation, transmission and reception of signals and/or channels may be panel-specifically performed. Here, "panel-specific" may mean that transmission and reception of signals and/or channels in units of panels can be performed. Panel-specific transmission/reception may also be referred to as panel-selective transmission/reception.

With respect to panel-specific transmission and reception in the multi-panel-based operation proposed in the present disclosure, a method of using identification information (e.g., an identifier (ID), an indicator, etc.) for setting and/or indicating a panel to be used for transmission and reception among one or more panels may be considered.

As an example, an ID for a panel may be used for panel selective transmission of a PUSCH, a PUCCH, an SRS, and/or a PRACH among a plurality of activated panels. The ID may be set/defined based on at least one of the following four methods (Alts 1, 2, 3, and 4).

Alt.1: ID for a panel may be an SRS resource set ID.

As an example, when the aspects according to a) to c) below are considered, it may be desirable that each UE Tx panel correspond to an SRS support set that is set in terms of UE implementation.

a) SRS resources of multiple SRS resource sets having the same time domain operation are simultaneously transmitted in the same bandwidth part (BWP).

b) Power control parameters are set in units of SRS resource sets.

c) A UE reports a maximum of 4 SRS resource sets (which may correspond to up to 4 panels) according to A supported time domain operation.

In the case of Alt.1 method, an SRS resource set related to each panel may be used for "codebook" and "non-codebook" based PUSCH transmission. In addition, a plurality of SRS resources belonging to a plurality of SRS resource sets may be selected by extending an SRI field of DCI. A mapping table between a sounding reference signal resource indicator (SRI) and an SRS resource may need to be extended to include the SRS resource in all SRS resource sets.

Alt.2: ID for a panel may be an ID (directly) associated with a reference RS resource and/or a reference RS resource set.

Alt.3: ID for a panel may be an ID directly associated with a target RS resource (reference RS resource) and/or a reference RS resource set.

In the case of Alt.3 method, configured SRS resource set(s) corresponding to one UE Tx panel can be controlled more easily, and the same panel identifier can be allocated to a plurality of SRS resource sets having different time domain operations.

Alt.4: ID for a panel may be an ID additionally set in spatial relation info (e.g., RRC parameter (SpatialRelationInfo)).

The Alt.4 method may be a method of newly adding information for indicating an ID for a panel. In this case, configured SRS resource set(s) corresponding to one UE Tx panel can be controlled more easily, and the same panel identifier can be allocated to a plurality of SRS resource sets having different time domain operations.

As an example, a method of introducing a UL TCI similarly to the existing DL TCI (Transmission Configuration Indication) may be considered. Specifically, UL TCI state definition may include a list of reference RS resources (e.g., SRS, CSI-RS and/or SSB). The current SRI field may be reused to select a UL TCI state from a configured set. Alternatively, a new DCI field (e.g., UL-TCI field) of DCI format 0_1 may be defined for the purpose of indicating the UL TCI state.

Information (e.g., panel ID, etc.) related to the above-described panel-specific transmission and reception can be transmitted through higher layer signaling (e.g., RRC message, MAC-CE, etc.) and/or lower layer signaling (e.g., L1 signaling, DCI, etc.). The information may be transmitted from a base station to a UE or from the UE to the base station according to circumstances or as necessary.

Further, the corresponding information may be set in a hierarchical manner in which a set for a candidate group is set and specific information is indicated.

Further, the above-described panel-related identification information may be set in units of a single panel or in units of multiple panels (e.g., a panel group or a panel set).

The contents (the 3GPP system, the frame structure, the NR system, etc.) described above may be applied in combination with methods proposed in the present disclosure to be described below or may be supplemented to clarify technical features of the methods proposed in the present disclosure. Methods to be described below are just distinguished for convenience and it is needless to say that some components of any one method may be substituted with some components of another method or may be applied in combination with each other.

In Rel-15 NR, spatialRelationInfo is utilized in order to indicate a transmit beam which the BS is to utilize when transmitting a UL channel to the UE. Specifically, the BS may configure a DL reference signal (e.g., SSB-RI, CRI(P/SP/AP)) or an SRS (i.e., SRS resource) as a reference RS for a target UL channel or A target RS through an RRC configuration. Through such a configuration, the BS may indicate which UL transmit beam is to be utilized when transmitting the PUCCH/SRS.

The transmit beam of the SRS transmitted through the indication is indicated as a transmit beam for the PUSCH through the SRI field and used as the PUSCH transmit beam of the UE when the BS schedules the PUSCH to the UE. In the present disclosure, a background for a UL-TCI framework considered as a form expanding a framework called the spatialRelationInfo will be described. In the present disclosure, a method for indicating the transmit beam for the uplink channel of the UE by utilizing an uplink transmission configuration indicator (UL-TCI) and a transmit beam determination behavior of the UE which is subsequent according to the method will be described.

In Rel-15 NR, a beam for the PUSCH transmission of the UE may be indicated through the configuration of the SRI field of UL DCI as in the description of the beam management. A case where a beam correspondence will not be established and a case where the beam correspondence will be established for the corresponding procedure may be separately described.

In the case where the beam correspondence will not be established, the following procedure is performed.

1) A UL beam management behavior for finding a best UL analog beam is performed by utilizing multiple resources of an SRS resource set in which a usage is 'BM'.

2) A resource(s) determined as the best UL analog beam is linked to spatial relation information (e.g., SRS-SpatialRelationInfo) of resources which belong to an SRS resource set in which the usage is codebook (CB)' or 'non-codebook (non-CB)' as a result of UL BM. The UE may transmit the SRS in which the usage is 'CB' or 'non-CB' by the corresponding analog beam, and expect to being indicated with link adaptation and modulation and coding scheme (MCS)/rank indicator (RI)/transmission precoding matrix indicator (TPMI).

3) Finally, a candidate for a PUSCH beam indication may be configured based on the SRI field. Specifically, the candidate may be configured as the resources which belong to the SRS resource set which is 'CB' or 'non-CB' through the RRC based on one or two SRS resource indicators (SRIs).

As described above, the PUSCH beam indication may be performed based on the indication of the SRI field of the UL DCI for scheduling the PUSCH. In order for the resources which belong to the SRS resource set which is the 'CB' or 'non-CB' configured in the SRI field to be available for the PUSCH bema indication, the resources which belong to the SRS resource set which is the 'CB' or 'non-CB' should be transmitted through the SRS at least once before the UL DCI including the SRI indication.

When the bean correspondence is established, a UL BM behavior is omitted. A DL RS ID (CSI-RSI/SSB-RI) is configured in spatial relation information (e.g., SRS-SpatialRelationInfo) of the resource(s) of the SRS resource set in which the usage is 'CB' or 'non-CB' to configure a UL analog beam corresponding to the DL beam through the SRI field. Even in this case, the resources which belong to the SRS resource set which is the 'CB' or 'non-CB' should be transmitted through the SRS at least once before the UL DCI including the SRI indication.

As described above, the TCI state is utilized for the BS to configure/indicate, to the UE, a receive beam (i.e., spatial Rx parameter) to be utilized when receiving the PDCCH and the PDSCH by utilizing a Quasi co-located (QCL) concept introduced in (Rel-15) NR. A downlink reference signal (e.g., SSB-RI, CRI (P/SP/AP)) may be configured as a reference RS or a source RS of a QCL Type-D component through the corresponding TCI state. The BS may indicate, to the UE, utilizing the receive beam upon receiving the DL RS configured as the reference when receiving the PDCCH or PDSCH.

An agreement related to an Uplink Transmission Configuration Indicator (UL-TCI) will be described.

The BS may configure/indicate panel-specific transmission for UL transmission for uplink transmission through next Alt.2 or Alt.3.

Alt.2: A UL-TCI framework is introduced and a UL-TCI based signaling similar to a DL beam indication supported in Rel-15 is supported.

A new panel ID may or may not be introduced.

A panel specific signaling is performed using a UL-TCI state.

Alt.3: A new panel-ID is introduced. The corresponding panel-ID may be implicitly/explicitly applied to transmission for a target RS resource/resource set, a PUCCH resource, an SRS resource, or a PRACH resource.

The panel-specific signaling is implicitly (e.g., by DL beam reporting enhancement) or explicitly performed by the new panel-ID.

When the signaling is explicitly performed, the panel-ID may be configured in a target RS/channel or reference RS (e.g., DL RS resource configuration or spatial relation info).

A new MAC CE may not be designated for the panel-ID. Table 8 below shows the UL-TCI state based on the Alt.2.

TABLE 8

| Valid UL-TCI state Configuration | Source (reference) RS | (target) UL RS | [qcl-Type] |
|---|---|---|---|
| 1 | SRS resource (for BM) + [panel ID] | DM-RS for PUCCH or SRS or PRACH | Spatial-relation |
| 2 | DL RS(a CSI-RS resource or a SSB) + [panel ID] | DM-RS for PUCCH or SRS or PRACH | Spatial-relation |
| 3 | DL RS(a CSI-RS resource or a SSB) + [panel ID] | DM-RS for PUSCH | Spatial-relation + [port(s)-indication] |
| 4 | DL RS(a CSI-RS resource or a SSB) and SRS resource + [panel ID] | DM-RS for PUSCH | Spatial-relation + [port(s)-indication] |
| 5 | SRS resource + [panel ID] | DM-RS for PUSCH | Spatial-relation + [port(s)-indication] |

TABLE 8-continued

| Valid UL-TCI state Configuration | Source (reference) RS | (target) UL RS | [qcl-Type] |
|---|---|---|---|
| 6 | UL RS(a SRS for BM) and SRS resource + [panel ID] | DM-RS for PUSCH | Spatial-relation + [port(s)-indication] |

The UL-TCI is considered as an integrated framework for indicating the transmit panel/beam in the UL channel of the UE by the BS as in the agreement. This is a form in which a DL-TCI in existing Rel-15 NR is extended to UL.

A DL RS (e.g., SSB-RI, CRI) or a UL RS (e.g., SRS) is configured as a reference RS or a source RS to be utilized/applied as a transmit beam for a target UL channel (e.g., PUCCH, PUSCH, PRACH) or a target UL RS (e.g., SRS) through a UL-TCI configuration (e.g. RRC signaling). The UE may utilize a corresponding reference transmit beam upon transmitting the corresponding target channel/RS.

The UL-TCI framework has the same purpose as a framework structure such as spatialRelationInfo of the existing Rel-15. However, the UL-TCI framework has an advantage of being capable of reducing the overhead and the delay as compared with the existing scheme when indicating the PUSCH beam. The reason is that the SRS for the purpose of the 'CB' or 'non-CB' should be particularly transmitted before indicating the SRI indication for transmission of the PUSCH in the case of the existing scheme. Further, the UL-TCI framework is meaningful even in constructing an integrated transmit beam indicating method for all UL channels such as PUCCH/PUSCH/SRS.

Hereinafter, 'a method for the BS to indicate the transmit panel/beam of the UE and a subsequent transmit panel/beam determining behavior of the UE' proposed in the present disclosure will be described. In other words, hereinafter, based on a background in which the UL-TCI framework considered as the form that extends the framework such as spatialRelationInfo is described above, a method for indicating the transmit panel/beam for the UL channel/RS of the UE by the BS by utilizing the UL-TCI will be described, and the subsequent transmit panel/beam determining behavior of the UE will be described (hereinafter, Proposals 1, 2, 3, and 4).

Hereinafter, in the present disclosure, the transmit panel/beam to be utilized when transmitting the PUCCH/PUSCH may be construed/applied as the transmit panel/beam to be utilized when transmitting the DMRS of the PUCCH/PUSCH. Further, in the present disclosure, applying the transmit beam when transmitting PUCCH/PUSCH/PRACH/SRS, etc., may mean applying a spatial Tx parameter/spatial domain Tx filter/spatial Tx filter for the transmission of the PUCCH/PUSCH/PRACH/SRS.

[Proposal 1]

[Proposal 1-1]

The BS may indicate the transmit beams for the uplink channels of the UE based on the UL-TCI framework. Specifically, the panel ID may exist as an information element (IE) of a UL-TCI state configuration. That is, the BS may indicate the transmit beam to be utilized in the target UL channel through the reference RS of the UL-TCI and indicate through which panel the corresponding target UL channel is to be transmitted. The reference RS of the UL-TCI may be configured as the DL RS (e.g., SSB-RI, CRI) or the UL RS (e.g., SRS).

A UL-TCI state configuration to which the panel ID is added may be expressed as in Table 9 below. In Table 9, a potential target UL channel of a fourth column may be a virtual target channel, and the target UL channel may not exist as the information element (IE) in each UL-TCI state configuration. That is, as transmit beam information for the target channel upon configuration/indication/scheduling of the target UL channel, one or multiple UL-TCI states may be linked/connected/configured in a UL-TCI state pool.

With respect to the PUCCH as an example, when the BS configures the PUCCH resource through the RRC, a specific UL-TCI state index may be configured (i.e., a UL-TCI state having a specific index may be configured) as transmit beam information for each PUCCH resource. Further, in the case of the SRS resource, a specific UL-TCI state index may be configured as the transmit beam information similarly to the PUCCH resource. With respect to the PUSCH, the transmit beam information may be configured as in Proposal 3 to be described below.

Hereinafter, a transmission configuration based on the embodiment will be described with a specific example.

As an example, in NR, a configuration for the PUCCH transmit beam is performed through an information element (IE) such as PUCCH-spatialRelationInfo for the PUCCH resource. As in the scheme, with respect to information on the UL-TCI, a transmission configuration of each PUCCH resource may be performed in a form in which a separate IE such as PUCCH-transmissionConfigurationIndicator exists for each PUCCH resource and configures a valid UL-TCI state index in the corresponding IE.

As another example, a field which may configure the UL-TCI state index may exist inside the existing PUCCH-spatialRelationInfo. Further, as the transmit beam configuration of the SRS is performed through the IE such as spatialRelationInfo even in the SRS resource in Rel-15 NR, the transmission configuration of each SRS resource may be performed in a form of configuring the UL-TCI state index inside the SRS resource-specific configuration.

The transmission configuration may be available with respect to the PUSCH as in Proposal 3 to be described below. In this case, the following matters may be considered in relation to coexistence of spatialRelationInfo which pre-exists for the transmission beam configuration of PUCCH/PUSCH/SRS and the UL-TCI state configuration. As in spatialRelationInfo, a field for configuring the UL-TCI state configuration mentioned above may exist as an optional form. If the UL-TCI state configuration exists in addition to the spatialRelationInfo configuration, the UE may disregard a transmit bema configuration part and follow the transmit beam/panel configuration of the UL-TCI state in spatialRelationInfo.

Table 9 below shows the UL-TCI state configuration including the panel ID.

TABLE 9

| Valid UL-TCI state Configuration | P-ID (panel ID) | Reference RS | (Potential) Target UL channel | [qcl-Type] |
|---|---|---|---|---|
| 1 | 1 | SRS resource (for BM) | PUCCH or SRS or PRACH | Spatial-relation |
| 2 | 1 | DL RS(a CSI-RS resource or a SSB) | PUCCH or SRS or PRACH | Spatial-relation |
| 3 | 2 | SRS resource (for BM) | PUCCH or SRS or PRACH | Spatial-relation |
| 4 | 2 | DL RS(a CSI-RS resource or a SSB) | PUCCH or SRS or PRACH | Spatial-relation |
| 5 | 1 | DL RS(a CSI-RS resource or a SSB) | PUSCH | Spatial-relation + [port(s)-indication] |
| 6 | 1 | DL RS(a CSI-RS resource or a SSB) and SRS resource | PUSCH | Spatial-relation + [port(s)-indication] |
| 7 | 1 | SRS resource | PUSCH | Spatial-relation + [port(s)-indication] |
| 8 | 1 | UL RS(a SRS for BM) and SRS resource | PUSCH | Spatial-relation + [port(s)-indication] |
| 9 | 2 | DL RS(a CSI-RS resource or a SSB) | PUSCH | Spatial-relation + [port(s)-indication] |
| 10 | 2 | DL RS(a CSI-RS resource or a SSB) and SRS resource | PUSCH | Spatial-relation + [port(s)-indication] |
| 11 | 2 | SRS resource | PUSCH | Spatial-relation + [port(s)-indication] |
| 12 | 2 | UL RS(a SRS for BM) and SRS resource | PUSCH | Spatial-relation + [port(s)-indication] |

A first row of Table 9 above includes the panel ID, the reference RS, and the target UL channel, and each of the panel ID, the reference RS, and the target UL channel is described above. A QCL type [gcl-Type] has a spatial relation attribute when only the transmit beam (e.g., analog beam) may be just indicated like PUCCH/SRS/PRACH. When up to a port(s) indication and a precoder (e.g., a digital beam) should be indicated through the SRS for the purpose of the 'CB' or 'non-CB' which is previously transmitted like the PUSCH, the QCL type has attributes of the spatial relation and the port indication.

The panel-ID IE exists for each UL-TCI state as in Table 9 above, and the BS may configure/indicate through which panel the target UL channel is to be transmitted in addition to the transmit beam to be utilized/applied at the time of transmitting the target UL channel through the RRC configuration.

An integrated panel indication for all UL channels is available through the IE configuration of the UL-TCI state configuration as in Proposal 1-1.

[Proposal 1-2]

A panel configuration information (PCI) field may be included in the IE of the UL-TCI state configuration instead of the P-ID field which is the information element (IE) of Proposal 1-1 above. The panel configuration information field (or panel configuration information IE) may include at least one of the following information. The embodiment may also be equally applied to proposal schemes (Proposals 2, 3, and 4) to be described below.

① One or Multiple Panel IDs (P-IDs)

The multiple P-IDs may be utilized for multi-panel simultaneous transmission of multi-panel UEs as shown in Table 11 of Proposal 4 to be described below.

② P-ID-Specific UL Power Control Related Parameter

For example, the P-ID-specific UL power control related parameter may include an open-loop power control parameter set (e.g., P0, alpha, pathloss value, etc.) and a closed-loop power control parameter set (e.g., TPC command series).

③ P-ID-Specific Timing Advance (TA) Value

④ P-ID-Specific UL-PTRS Port Mapping

Phase noise may be different for each panel, so mapping information between UL-PTRS ports and the P-ID(s) may be included. An example of the mapping information is as follows. The BS may be configured to transmit UL-PTRS port 0 in P-ID 0, and transmit UL-PTRS port 1 in P-ID 1. That is, the BS may be configured for the UE to explicitly transmit specific UL-PTRS port X in a specific P-ID.

According to an embodiment, the mapping information may be included only when multiple P-IDs (and multiple UL-PTRS ports) are configured. When the mapping information is omitted, a default mapping scheme may be applied. As an example, the default mapping scheme may be a scheme in which the P-ID and the UL PTRS port ID are mapped one to one (in an (ascending/descending) order).

According to an embodiment, multiple UL-PTRS port IDs may be configured in one P-ID based on the mapping information.

According to an embodiment, the number of ports of the UL-PTRS configurable for supporting multi-panel selective transmission and multi-panel simultaneous transmission may increase based on that the number of ports of the UL-PTRS configurable to the UE in the related art is up to 2. That is, the maximum port number of the configurable UL-PTRS may become a multiple of the panel number (e.g., 2*(panel number)).

According to an embodiment, the information of ②, ③, or ④ may be configured as a separate field (s) and/or IE of the UL-TCI state configuration.

The embodiment (introduction of the PCI field or configuration/definition of the information of ②, ③, or ④ for each panel in the UL-TCI state configuration) has the following effect. The configuration/indication/update for each uplink channel is available in the integrated framework such as the UL-TCI state so as to handle the wireless channel situation which may vary for each panel.

In particular, power control related configurations of ② may be configured by relying on each panel of the UE and configured by separately relying on a reference RS (e.g., a source RS of spatialRelationInfo and/or a reference RS of the UL-TCI state) of the UL channel/RS transmit beam. Specifically, in the power control related configuration, the power control parameter set may vary based on the reference RS configured for the transmission of the target uplink channel/reference signal. As an example, a pathloss value or a reference signal received power (RSRP) value may vary when previously receiving a corresponding DL RS according to whether the reference RS of the transmit beam of the UL channel/RS is the SSB-RI or the CRI. When the transmit beam corresponding to the receive beam is used, a power control may be required to be configured differently in order to obtain the same capability according to the DL RS. Therefore, the following behavior may be considered.

When the reference RS configured for the transmit beam varies in the UL channels/RSs (e.g., PUCCH, PUSCH, SRS, PRACH) of the UE, the power control parameter set may vary depending on the corresponding RS.

[Proposal 2]

[Proposal 2-1]

In the UL-TCI state configuration, the reference RS may not be configured in a specific UL-TCI state (e.g., reference RS=N/A or reference RS=[ ](empty), UL-TCI state 5/6 of Table 10 to be described below). The UL-TCI state may be utilized for the SRS resource(s) (target UL channel) to be transmitted for the 'BM' usage.

The SRS resource(s) for the 'BM' usage in which the UL-TCI state is configured may be utilized for an (initial) beam management ((initial) UL beam management) behavior, and the UE may voluntarily determine the transmit beam of the SRS in order to find a best UL beam. The UE may perform beam sweeping through the SRS resource(s) for the 'BM' usage, and the BS may configure/indicate a best beam for sequential uplink channel transmission of the UE by recognizing a UL best beam.

Effects according to the embodiment are as follows.

When the spatial relation of the SRS resource for the 'BM' usage in the related art is not configured, how to configure the transmit beam and/or panel upon transmitting the corresponding SRS is fully handled by the UE. In the embodiment, there may be an effect that the BS indicates a panel to be transmitted for the 'BM' usage SRS through the UL-TCI state to resolve a concern that transmission may be continued to the UE only with a preferred panel.

Additionally, the BS may indicate panel selective UL channel transmission by considering a quality of a panel-specific UL transmit beam (e.g., SRS transmit beam). The BS may configure/indicate multi-panel simultaneous transmission considering a multi-panel-specific UL transmit beam quality of the UE, to a UE capable of multi-panel simultaneous transmission.

[Proposal 2-2]

In the UL-TCI state configuration, the reference RS and the panel ID may not be configured in a specific UL-TCI state (e.g., UL-TCI state 7 of Table 10). The UL-TCI state may be utilized for the SRS resource(s) (target UL channel) to be transmitted for the 'BM' usage.

In order to find a best panel and a best UL beam through the SRS resource(s) for the 'BM' usage in which the UL-TCI state is configured, the UE may voluntarily determine the transmit panel and the transmit beam. The UE may perform panel/beam sweeping through the SRS resource(s) for the 'BM' usage, and the BS may configure/indicate the best beam and the best beam for sequential uplink channel transmission of the UE by recognizing a UL best beam and a UL best beam.

In the embodiment, a discretionary power is granted to the UE even for the panel determination upon transmitting the SRS for the 'BM' usage in addition to Proposal 2-1 above, and as a result, the UE may more flexibly operate in relation to the transmission of the uplink signal.

The UL-TCI state configuration based on two proposals (Proposals 2-1 and 2-2) above may be represented as in Table 10 below (UL-TCI state 5/6/7). Specifically, Table 10 below shows a UL-TCI state configuration in which the panel ID and/or the reference RS are/is not configured.

TABLE 10

| Valid UL-TCI state Configuration | P-ID (panel ID) | Reference RS | (Potential) Target UL channel | [qcl-Type] |
|---|---|---|---|---|
| 1 | 1 | SRS resource (for BM) | PUCCH or SRS or PRACH | Spatial-relation |
| 2 | 1 | DL RS(a CSI-RS resource or a SSB) | PUCCH or SRS or PRACH | Spatial-relation |
| 3 | 2 | SRS resource (for BM) | PUCCH or SRS or PRACH | Spatial-relation |
| 4 | 2 | DL RS(a CSI-RS resource or a SSB) | PUCCH or SRS or PRACH | Spatial-relation |

TABLE 10-continued

| Valid UL-TCI state Configuration | P-ID (panel ID) | Reference RS | (Potential) Target UL channel | [qcl-Type] |
|---|---|---|---|---|
| 5 | 1 | N/A(ex: empty) | SRS resource (for BM) | Spatial-relation |
| 6 | 2 | N/A(ex: empty) | SRS resource (for BM) | Spatial-relation |
| 7 | N/A | N/A(ex: empty) | SRS resource (for BM) | Spatial-relation |

As in Proposals 2-1 and 2-2 above, the specific UL-TCI state in which the reference RS and/or the P-ID are/is not configured may be configured only in a specific UL channel/RS. As an example, the target UL channel to be used/utilized of the UL-TCI state may be limited to the 'BM' usage SRS (SRS resources in the 'BM' usage SRS resource set). As described above, the target UL channel is limited to prevent the ambiguity of the UE operation.

[Proposal 2-3]

In the specific UL-TCI state, the reference RS may be configured, but the P-ID may not be configured. The UL-TCI state may be utilized for the SRS resource(s) (target UL channel) to be transmitted for the 'BM' usage. The UE may voluntarily determine the transmit panel in order to find the best panel through the 'BM' usage SRS resource(s) in which the corresponding UL-TCI state is configured.

For example, the configured reference RS may be the DL RS, and the UE may measure the corresponding DL RS with multi-panels and the transmit beam for each panel may exist with respect to the same DL RS. Thereafter, in the 'BM' usage SRS resource(s), the UE may determine the panel selection, and then transmit the corresponding SRS. That is, there is an effect that some DL anchor beams are provided to the UE in which the beam correspondence is not complete.

That is, the operations in Proposals 2-2 and 2-3 above intends panel selective transmission in the SRS transmission of the UE, and if the corresponding UL-TCI state is utilized in the SRS resource(s) within the SRS resource set configured for the 'BM' usage, the UE may transmit the SRS based on i) or ii) below.

i) Transmission by changing the panel in units of "contiguous" SRS resource (sequentially transmitting the SRS resources like panel 1, panel 2, panel 1, and panel 2)

ii) Transmission by changing the panel in units of specific SRS resource group (e.g., defining/forming any group among SRS resources in which the same transmit panel is configured by the UE itself) (e.g., first transmitting the SRS resource and switching the transmitted SRS resource for one panel for each group like panel 1, panel 1, panel 2, and panel 2)

In the case of ii) above, a UE which requires a switching delay or an RF retuning time in the panel switching has an advantage in that the delay may be reduced by decreasing the number of panel switching times and wasted resources may be reduced by decreasing a guard period.

Here, the "contiguous" SRS resource may be an SRS resource based on at least one of 1) to 3) below.

1) Contiguous SRS resource(s) when re-ordering/re-indexing global SRS resource IDs (e.g., RRC parameter srs-ResourceId) in the ascending/descending order within the SRS resource set 2) Contiguous SRS resource(s) at each configured time domain location (e.g., symbol level location) of the SRS resource 3) SRS resource(s) in which each configured spatial domain filter of the SRS resource is contiguous (e.g., contiguous in the ascending/descending order) in a (vertical and/or horizontal) angular domain In other words, the contiguous SRS resource(s) may be related to at least one of 1) SRS resource ID arranged in a specific order, 2) a location of each SRS resource in a time domain (e.g., a symbol location), 3) an angular domain of a spatial domain filter configured in each SRS resource.

[Proposal 2-4]

The UL-TCI state in Proposals 2-1, 2-2, and 2-3 above may be configured at an SRS resource set level. Specifically, the UL-TCI state may be configured as a spatial relation source of the SRS resource set level other than an SRS resource level.

This has an effect of reducing the overhead by configuring the spatial relation source once at a set level rather than a resource level (configuring the spatial relation source in one UL-TCI state).

As an example, when the panel ID is configured and the reference RS is not configured for multiple ('BM' usage) SRS resources (the SRS resource set including the multiple ('BM' usage) SRS resources, the UE may apply the same panel ID in transmission of the "contiguous" SRS resources, but apply a different spatial domain filter.

As another example, when neither the panel ID nor the reference RS is configured for multiple ('BM' usage) SRS resources (the SRS resource set including the multiple ('BM' usage) SRS resources, the UE applies a different panel ID and the different spatial domain filter in transmission of the "contiguous" SRS resources.

In particular, when the panel ID is not configured, the UE may transmit the SRS based on i) or ii) below.

i) Transmission by changing the panel in units of "contiguous" SRS resource (sequentially transmitting the SRS resources like panel 1, panel 2, panel 1, and panel 2)

ii) Transmission by changing the panel in units of specific SRS resource group (e.g., defining/forming any group among SRS resources in which the same transmit panel is configured by the UE itself) (e.g., first transmitting the SRS resource and switching the transmitted SRS resource for one panel for each group like panel 1, panel 1, panel 2, and panel 2)

In the case of ii), a UE which requires a switching delay or an RF retuning time in the panel switching has an advantage in that the delay may be reduced by decreasing the number of panel switching times and wasted resources may be reduced by decreasing a guard period.

Here, the "contiguous" SRS resource may be an SRS resource based on at least one of 1) to 3) below.

1) Contiguous SRS resource(s) when re-ordering/re-indexing global SRS resource IDs (e.g., RRC parameter srs-ResourceId) in the ascending/descending order within the SRS resource set 2) Contiguous SRS resource(s) at each configured time domain location (e.g., symbol level location) of the SRS resource 3) SRS resource(s) in which each configured spatial domain filter of the SRS resource is contiguous (e.g., contiguous in the ascending/descending order) in a (vertical and/or horizontal) angular domain In other words, the contiguous SRS resource(s) may be related to at least one of 1) SRS resource ID arranged in a specific order, 2) a location of each SRS resource in a time domain (e.g., a symbol location), 3) an angular domain of a spatial domain filter configured in each SRS resource.

According to an embodiment, the UL-TCI state may be configured for each SRS resource group level. Specifically, the UL-TCI state may be configured as the spatial relation source at the SRS resource group level other than the SRS resource level. The UL-TCI state is configured for each SRS resource group constituting by predetermined resources having the same attribute within the SRS resource set to reduce the overhead and improve the flexibility of the UL-TCI configuration.

According to an embodiment, the UL-TCI may be configured at the PUCCH resource group level. A PUCCH resource group may be introduced, which is constituted by the PUCCH resources. As a result, the UL-TCI state may be configured through the RRC or updated through the MAC-CE even in units of the PUCCH resource group. The PUCCH resource group may mean a PUCCH group to each TRP in multi-TRP transmission. Accordingly, the configuration/indication/update of the (PUCCH resource group unit) UL-TCI state may have an effect of minimum configurability and overhead reduction (for each TRP).

[Proposal 3]

The UL-TCI state may be configured as large as up to n (e.g., n=128) from the BS through the RRC configuration. The BS may link/connect the UL-TCI state to the target uplink channel/RS (e.g., PUCCH, PUSCH, PRACH, SRS) through the RRC configuration. The BS may configure/indicate a panel to be utilized/applied when the UE transmits the corresponding uplink channel/RS through the operation. In particular, for a dynamic panel and transmit beam indication in the PUSCH transmission, the UL-TCI state filed may additionally exist in the SRI field instead of the SRI field in the UL DCI (similarly to the TCI state field of the DL DCI (e.g., 3 bits)). The BS may configure and update m (e.g., m=8) states among a total of n states as a candidate state which is to constitute the UL-TCI state field of the corresponding UL DCI.

There is the following advantage by updating the UL-TCI state field of the UL DCI through a Multiple Access Control-Control Element (MAC-CE).

The BS that receives reporting of the UE for the DL RS and the UL RS of the UE may immediately update a best beam/panel candidate group (UL-TCI state(s)) to candidate UL TCI states of the UL-TCI state field of the UL DCI. Accordingly, the BS may dynamically indicate the best beam/panel among the candidate UL-TCI states upon scheduling the PUSCH.

Alternatively, the SRI field of the UL DCI for indicating information (i.e., rank, TPMI, etc.) required for the PUSCH transmission is left as it is, but information of the UL-TCI state field may be applied to an SRS resource(s) indicated by a codepoint of the SRI for a transmit beam usage instead of a conventional spatial relation. That is, the conventional SRI field may be reused for indicating UL MIMO transmission information (i.e., rank, TPMI, etc.) which is conventional information except for the PUSCH transmit beam in the SRI field. In just PUSCH transmit beam determination, the UL-TCI state may be utilized. The operation serves to supplement a precoder (e.g., digital beam) indication which is a blind spot of the UL-TCI state. On the contrary, only the SRS resources for the 'CB' and 'non-CB' usages are not limited to the candidate of the SRI field, but the SRS resources for the 'BM' usage are also connected to the codepoint of the SRI field to be configured as the SRI candidate upon transmitting the PUSCH.

After the SRS resources for the 'BM' usage of a single-port or multi-ports are transmitted for initial beam sweeping through the additional definition/configuration, the SRS resources are configured/indicated/updated as the SRI candidate immediately without the delay to be used upon scheduling the PUSCH.

[Proposal 4]

In order to support multi-panel simultaneous transmission of the UE, a plurality of panel IDs may be configured in the P-ID which is the IE of the UL-TCI state configuration in Proposal 1 above. Further, a plurality of reference RSs may also be configured for the transmit bema indication for each panel. Table 11 below shows the UL-TCI state based on the embodiment.

In the example of Table 11 below, in the case of UL-TCI state configuration index 3, a plurality of P-IDs is configured, but only one reference RS for the transmit beam is configured. When the corresponding reference RS is the DL RS, the UE measures the corresponding DL RS with the multi-panels and the receive beam for each panel may exist for the same DL RS, and as a result, the UE may perform UL multi-panel simultaneous transmission with the transmit beams corresponding to the receive beam for each panel.

Table 11 below shows the UL-TCI state configuration supporting multi-panel simultaneous transmission.

TABLE 11

| Valid UL-TCI state Configuration | P-ID (panel ID) | Reference RS | (Potential) Target UL channel | [qcl-Type] |
|---|---|---|---|---|
| 1 | 1 | DL RS(a CSI-RS resource or a SSB) | PUSCH | Spatial-relation + [port(s)-indication] |
|  | 2 | DL RS(a CSI-RS resource or a SSB) and SRS resource | PUSCH | Spatial-relation + [port(s)-indication] |
| 2 | 1 | SRS resource | PUSCH | Spatial-relation + [port(s)-indication] |

TABLE 11-continued

| Valid UL-TCI state Configuration | P-ID (panel ID) | Reference RS | (Potential) Target UL channel | [qcl-Type] |
|---|---|---|---|---|
| | 2 | UL RS(a SRS for BM) and SRS resource | PUSCH | Spatial-relation + [port(s)-indication] |
| 3 | 1 | CRI 1 | PUSCH | Spatial-relation + [port(s)-indication] |
| | 2 | CRI 1 | PUSCH | Spatial-relation + [port(s)-indication] |
| 4 | 1 | SRS resource 1 | PUSCH | Spatial-relation + [port(s)-indication] |
| | 2 | SRS resource 2 | PUSCH | Spatial-relation + [port(s)-indication] |

A single UL-TCI state is connected to the uplink channel through such a UL-TCI state constitution/configuration to support the multi-panel simultaneous transmission of the UE.

According to an embodiment, the BS links a plurality of conventional UL-TCI states to any uplink channel of the UE in Tables 9 and 10 above to support the multi-panel transmission of the UE upon transmitting the uplink channel. As an example, the BS may link/connect multiple UL-TCI states to one codepoint as RRC description in the UL-TCI state field (e.g., 3-bit field) of the UL DCI of Proposal 3 above, and update the UL-TCI states through the MAC-CE. When the BS indicates the corresponding codepoint of the UL-TCI state field upon scheduling the PUSCH, the UE may transmit the PUSCH by utilizing multiple UL-TCI state panel(s) and transmit beam(s) connected to the codepoint.

The plurality of UL-TCI states is connected to the uplink channel as described above to support multi-panel transmission of the UE.

Information included in a reference RS field based on Tables 9 to 11 of the present disclosure may be an SSB index (e.g., SSB resource index, SSBRI) in the case of the CSI-RS and an SRS resource index (SRI) in the case of the SRS.

Further, when the UL-TCI state configuration of Proposals 1 to 4 of the present disclosure is utilized for the PRACH, the UL-TCI state configuration may be used only for Contention-Free Random Access (CFRA) (e.g., PDCCH-ordered PRACH).

In the proposals (in particular, contents of Proposals 2 and 4) of the present disclosure, a meaning may not be limited within the framework such as the UL-TCI state, and is applicable to a specific procedure indicating the transmit beam for a general UL channel/RS.

In terms of implementation, the operations of the BS/UE according to the above-described embodiments (e.g., operations related to the transmission of the uplink signal based on at least one of Proposals 1-1/2-1/2-2/2-3/2-4/3/4) may be processed by devices (e.g., processors 102 and 202 in FIG. 21) in FIGS. 20 to 24 to be described below.

Further, the operations of the BS/UE according to the above-described embodiments (e.g., operations related to transmission of the uplink signal based on at least one Proposals 1-1/2-1/2-2/2-3/2-4/3/4) may be stored in a memory (e.g., memories 104 and 204 in FIG. 21) in the form of a command/program (e.g., instruction or executable code) for driving at least one processor (e.g., 102 or 202 in FIG. 21).

FIG. 14 illustrates a PUCCH transmission procedure to which a method proposed in the present disclosure is applied.

Specifically, FIG. 14 illustrates an example of a PUCCH signaling between a user equipment (UE) and a base station (BS) based on the above-described proposal method (e.g., Proposal 1 (Proposal 1-1/1-2)/Proposal 2 (Proposal 2-1/2-2/2-3/2-4, etc.) (herein, the UE/BS is just an example, and may be replaced and applied with various devices as described in FIGS. 20 to 24 to be described below). FIG. 14 is just for convenience of the description and does not limit the scope of the present disclosure. Further, some step(s) illustrated in FIG. 14 may be omitted according to a situation and/or a configuration.

Hereinafter, the UE operation aspect will be described.

The UE may transmit UE capability information to the BS (S1410). The UE capability information may include UE capability information related to a panel. As an example, the UE capability information may include the number of panels (groups) which may be supported by the UE, information indicating whether multi-panel based simultaneous transmission may be performed, information on the MPUE category, etc. For example, the UE may transmit, the BS, UE capability information related to the above-described proposal methods (e.g., Proposal 1 (Proposal 1-1/1-2)/Proposal 2 (Proposal 2-1/2-2/2-3/2-4), Proposal 3/Proposal, etc.).

For example, the operation of transmitting the UE capability information by the UE in step S1410 described above may be implemented by devices of FIGS. 20 to 24 to be described below. For example, referring to FIG. 21, one or more processors 102 may control one or more transceivers 106 and/or one or more memories 104 to transmit the UE capability information, and one or more transceivers 106 may transmit the UE capability information to the BS.

The UE may receive a UL TCI state related configuration from the BS (S1420). The UL TCI state related configuration may include information for a configuration and/or an indication of a panel/beam related to uplink transmission (e.g., PUCCH/PUSCH/PRACH/SRS, etc.) of the UE. For example the UL TCI state related configuration may be configured based on the above-described method (e.g., Proposal 1 (Proposal 1-1/1-2)/Proposal 2 (Proposal 2-1/2-2/2-3/2-4), Proposal 3/Proposal 4, etc.). As an example, the UL TCI state related configuration may be configured based on the IE/field of Table 9/10 described above. The UL TCI state related configuration may be delivered through higher layer signaling (e.g., RRC signaling), etc.

For example, the operation of the UE which receives the UL TCI state related configuration in step S1420 described above may be implemented by the devices in FIGS. 20 to 24 to be described below. For example, referring to FIG. 21, one or more processors 102 may control one or more transceivers 106 and/or one or more memories 104 so as to receive the UL DCI state related configuration, and one or more transceivers 106 may receive, from the BS, the UL TCI state related configuration.

The UE may receive, from the BS, a PUCCH related configuration (e.g., PUCCH-Config, etc.) (S1430). The PUCCH related configuration may include configuration information related to the PUCCH transmission of the UE, and may be delivered through higher layer signaling (e.g., RRC signaling), etc. For example, the PUCCH related configuration may include configuration and/or indication information for a panel/beam related to the PUCCH transmission. As an example, the PUCCH related configuration may include configuration information for a correlation between a UL TCI state according to the above-described method (e.g., Proposal 1 (Proposal 1-1/1-2)/Proposal 2 (Proposal 2-1/2-2/2-3/2-4), Proposal 3/Proposal 4, etc.), and the corresponding PUCCH transmission (e.g., PUCCH resource). As an example, spatialrelationInfo which is information related to the PUCCH transmission and the UL TCI state may be each independently configured according to a situation or a case, or configured in combination with each other.

For example, the operation of the UE which receives the PUCCH related configuration in step S1430 described above may be implemented by the devices in FIGS. 20 to 24 to be described below. For example, referring to FIG. 21, one or more processors 102 may control one or more transceivers 106 and/or one or more memories 104 so as to receive the PUCCH related configuration, and one or more transceivers 106 may receive, from the BS, the PUCCH related configuration.

The UE may transmit, to the BS, the PUCCH based on the PUCCH related configuration (S1440). As an example, when the UE receives, from the BS, a configuration for DL data (e.g., PDSCH) and/or CSI reporting (after receiving the PUCCH related configuration), the corresponding UE may transmit ACK/NACK information for the DL data and/or CSI for the CSI reporting through the PUCCH. With respect to the above-described proposal method (e.g., Proposal 1 (Proposal 1-1/1-2)/Proposal 2 (Proposal 2-1/2-2/2-3/2-4), Proposal 3/Proposal 4, etc.), the UE may transmit, to the BS, the PUCCH (through the panel(s) and/or beam(s) (e.g., a spatial filter related to the reference RS) indicated by the UL TCI state) based on the configured/indicated UL TCI state.

For example, the operation of the UE which transmits the PUCCH in step S1440 described above may be implemented by the devices in FIGS. 20 to 24 to be described below. For example, referring to FIG. 21, one or more processors 102 may control one or more transceivers 106 and/or one or more memories 104 so as to transmit the PUCCH, and one or more transceivers 106 may transmit the PUCCH to the BS.

Hereinafter, the BS operation aspect will be described.

The BS may receive UE capability information from the UE (S1410). The UE capability information may include UE capability information related to a panel. As an example, the UE capability information may include the number of panels (groups) which may be supported by the UE, information indicating whether multi-panel based simultaneous transmission may be performed, information on the MPUE category, etc. For example, the BS may receive, from the UE, UE capability information related to the above-described proposal method (e.g., Proposal 1 (Proposal 1-1/1-2)/Proposal 2 (Proposal 2-1/2-2/2-3/2-4), Proposal 3/Proposal, etc.).

For example, the operation of the BS which receives the UE capability information in step S1410 described above may be implemented by devices in FIGS. 20 to 24 to be described below. For example, referring to FIG. 21, one or more processors 202 may control one or more transceivers 206 and/or one or more memories 204 to receive the UE capability information, and one or more transceivers 206 may receive the UE capability information from the UE.

The BS may transmit a UL TCI state related configuration to the UE (S1420). The UL TCI state related configuration may include information for a configuration and/or an indication of a panel/beam related to uplink transmission (e.g., PUCCH/PUSCH/PRACH/SRS, etc.) of the UE. For example the UL TCI state related configuration may be configured based on the above-described method (e.g., Proposal 1 (Proposal 1-1/1-2)/Proposal 2 (Proposal 2-1/2-2/2-3/2-4), Proposal 3/Proposal 4, etc.). As an example, the UL TCI state related configuration may be configured based on the IE/field of Table 9/10 described above. The UL TCI state related configuration may be delivered through higher layer signaling (e.g., RRC signaling), etc.

For example, the operation of the BS which transmits the UL TCI state related configuration in step S1420 described above may be implemented by the devices in FIGS. 20 to 24 to be described below. For example, referring to FIG. 21, one or more processors 202 may control one or more transceivers 206 and/or one or more memories 204 so as to transmit the UL TCI state related configuration, and one or more transceivers 206 may transmit, to the UE, the UL TCI state related configuration.

The BS may transmit, to the UE, a PUCCH related configuration (e.g., PUCCH-Config, etc.) (S1430). The PUCCH related configuration may include configuration information related to the PUCCH transmission of the UE, and may be delivered through higher layer signaling (e.g., RRC signaling), etc. For example, the PUCCH related configuration may include configuration and/or indication information for a panel/beam related to the PUCCH transmission. As an example, the PUCCH related configuration may include configuration information for a correlation between a UL TCI state according to the above-described method (e.g., Proposal 1 (Proposal 1-1/1-2)/Proposal 2 (Proposal 2-1/2-2/2-3/2-4), Proposal 3/Proposal 4, etc.), and the corresponding PUCCH transmission (e.g., PUCCH resource). As an example, spatialrelationInfo which is information related to the PUCCH transmission and the UL TCI state may be each independently configured according to a situation or a case, or configured in combination with each other.

For example, the operation of the BS which transmits the PUCCH related configuration in step S1430 described above may be implemented by the devices in FIGS. 20 to 24 to be described below. For example, referring to FIG. 21, one or more processors 202 may control one or more transceivers 206 and/or one or more memories 204 so as to transmit the PUCCH related configuration, and one or more transceivers 206 may transmit, to the UE, the PUCCH related configuration.

The BS may receive, from the UE, the PUCCH transmitted based on the PUCCH related configuration (S1440). As an example, when the BS receives, from the BS, a configuration for DL data (e.g., PDSCH) and/or CSI reporting (after receiving the PUCCH related configuration), the corresponding BS may receive ACK/NACK information for the DL data and/or CSI for the CSI reporting through the PUCCH. With respect to the above-described proposal method (e.g., Proposal 1 (Proposal 1-1/1-2)/Proposal 2 (Proposal 2-1/2-2/2-3/2-4), Proposal 3/Proposal, etc.), the BS may receive, from the UE, a PUCCH transmitted based on the configured/indicated UL TCI state.

For example, the operation of the BS which receives the PUCCH in step S1440 described above may be implemented by the devices in FIGS. 20 to 24 to be described below. For example, referring to FIG. 21, one or more processors 202 may control one or more transceivers 206 and/or one or more memories 204 so as to receive the PUCCH, and one or more transceivers 206 may receive the PUCCH from the UE.

FIG. 15 illustrates an SRS transmission procedure to which a method proposed in the present disclosure is applied.

Specifically, FIG. 15 illustrates an example of an SRS signaling between a user equipment (UE) and a base station (BS) based on the above-described proposal method (e.g., Proposal 1 (Proposal 1-1/1-2)/Proposal 2 (Proposal 2-1/2-2/2-3/2-4, etc.) (herein, the UE/BS is just an example, and may be replaced and applied with various devices as described in FIGS. 20 to 24 to be described below). FIG. 15 is just for convenience of the description and does not limit the scope of the present disclosure. Further, some step(s) illustrated in FIG. 15 may be omitted according to a situation and/or a configuration.

Hereinafter, the UE operation aspect will be described.

The UE may transmit UE capability information to the BS (S1510). The UE capability information may include UE capability information related to a panel. As an example, the UE capability information may include the number of panels (groups) which may be supported by the UE, information indicating whether multi-panel based simultaneous transmission may be performed, information on the MPUE category, etc. For example, the UE may transmit, the BS, UE capability information related to the above-described proposal methods (e.g., Proposal 1 (Proposal 1-1/1-2)/Proposal 2 (Proposal 2-1/2-2/2-3/2-4), Proposal 3/Proposal, etc.).

For example, the operation of transmitting the UE capability information by the UE in step S1510 described above may be implemented by the devices of FIGS. 20 to 24 to be described below. For example, referring to FIG. 21, one or more processors 102 may control one or more transceivers 106 and/or one or more memories 104 to transmit the UE capability information, and one or more transceivers 106 may transmit the UE capability information to the BS.

The UE may receive a UL TCI state related configuration from the BS (S1520). The UL TCI state related configuration may include information for a configuration and/or an indication of a panel/beam related to uplink transmission (e.g., PUCCH/PUSCH/PRACH/SRS, etc.) of the UE. For example the UL TCI state related configuration may be configured based on the above-described method (e.g., Proposal 1 (Proposal 1-1/1-2)/Proposal 2 (Proposal 2-1/2-2/2-3/2-4), Proposal 3/Proposal 4, etc.). As an example, the UL TCI state related configuration may be configured based on the IE/field of Table 9/10 described above. The UL TCI state related configuration may be delivered through higher layer signaling (e.g., RRC signaling), etc.

For example, the operation of the UE which receives the UL TCI state related configuration in step S1520 described above may be implemented by the devices in FIGS. 20 to 24 to be described below. For example, referring to FIG. 21, one or more processors 102 may control one or more transceivers 106 and/or one or more memories 104 so as to receive the UL DCI state related configuration, and one or more transceivers 106 may receive, from the BS, the UL TCI state related configuration.

The UE may receive, from the BS, an SRS Related configuration (e.g., SRS-Config, etc.) (S1530). The SRS related configuration may include configuration information related to the SRS transmission of the UE, and may be delivered through higher layer signaling (e.g., RRC signaling), etc. For example, the SRS related configuration may include configuration and/or indication information for a panel/beam related to the SRS transmission. As an example, the SRS related configuration may include configuration information for a correlation between a UL TCI state according to the above-described method (e.g., Proposal 1 (Proposal 1-1/1-2)/Proposal 2 (Proposal 2-1/2-2/2-3/2-4), Proposal 3/Proposal 4, etc.), and the corresponding SRS transmission (e.g., SRS resource/SRS resource set). As an example, spatialrelationInfo which is information related to the SRS transmission and the UL TCI state may be each independently configured according to a situation or a case, or configured in combination with each other.

For example, the operation of the UE which receives the SRS related configuration in step S1530 described above may be implemented by the devices in FIGS. 20 to 24 to be described below. For example, referring to FIG. 21, one or more processors 102 may control one or more transceivers 106 and/or one or more memories 104 so as to receive the SRS related configuration, and one or more transceivers 106 may receive, from the BS, the SRS related configuration.

The UE may transmit, to the BS, the SRS based on the SRS related configuration (S1540). With respect to the above-described proposal method (e.g., Proposal 1 (Proposal 1-1/1-2)/Proposal 2 (Proposal 2-1/2-2/2-3/2-4), Proposal 3/Proposal 4, etc.), the UE may transmit, to the BS, the SRS (through the panel(s) and/or beam(s) (e.g., a spatial filter related to the reference RS) indicated by the UL TCI state) based on the configured/indicated UL TCI state.

For example, the operation of the UE which transmits the SRS in step S1540 described above may be implemented by the devices in FIGS. 20 to 24 to be described below. For example, referring to FIG. 21, one or more processors 102 may control one or more transceivers 106 and/or one or more memories 104 so as to transmit the SRS, and one or more transceivers 106 may transmit the SRS to the BS.

Hereinafter, the BS operation aspect will be described.

The BS may receive UE capability information from the UE (S1510). The UE capability information may include UE capability information related to a panel. As an example, the UE capability information may include the number of panels (groups) which may be supported by the UE, information indicating whether multi-panel based simultaneous transmission may be performed, information on the MPUE category, etc. For example, the BS may receive, from the UE, UE capability information related to the above-described proposal method (e.g., Proposal 1 (Proposal 1-1/1-2)/Proposal 2 (Proposal 2-1/2-2/2-3/2-4), Proposal 3/Proposal, etc.).

For example, the operation of the BS which receives the UE capability information in step S1510 described above may be implemented by devices in FIGS. 20 to 24 to be described below. For example, referring to FIG. 21, one or more processors 202 may control one or more transceivers 206 and/or one or more memories 204 to receive the UE capability information, and one or more transceivers 206 may receive the UE capability information from the UE.

The BS may transmit a UL TCI state related configuration to the UE (S1520). The UL TCI state related configuration may include information for a configuration and/or an indication of a panel/beam related to uplink transmission (e.g., PUCCH/PUSCH/PRACH/SRS, etc.) of the UE. For example the UL TCI state related configuration may be configured based on the above-described method (e.g., Proposal 1 (Proposal 1-1/1-2)/Proposal 2 (Proposal 2-1/2-2/2-3/2-4), Proposal 3/Proposal 4, etc.). As an example, the UL TCI state related configuration may be configured based on the IE/field of Table 9/10 described above. The UL TCI state related configuration may be delivered through higher layer signaling (e.g., RRC signaling), etc.

For example, the operation of the BS which transmits the UL TCI state related configuration in step S1520 described above may be implemented by the devices in FIGS. 20 to 24 to be described below. For example, referring to FIG. 21, one or more processors 202 may control one or more transceivers 206 and/or one or more memories 204 so as to transmit the UL DCI state related configuration, and one or more transceivers 206 may transmit, to the UE, the UL TCI state related configuration.

The BS may transmit, to the UE, an SRS related configuration (e.g., SRS-Config, etc.) (S1530). The SRS related configuration may include configuration information related to the SRS transmission of the UE, and may be delivered through higher layer signaling (e.g., RRC signaling), etc. For example, the SRS related configuration may include configuration and/or indication information for a panel/beam related to the SRS transmission. As an example, the SRS related configuration may include configuration information for a correlation between a UL TCI state according to the above-described method (e.g., Proposal 1 (Proposal 1-1/1-2)/Proposal 2 (Proposal 2-1/2-2/2-3/2-4), Proposal 3/Proposal 4, etc.), and the corresponding SRS transmission (e.g., SRS resource/SRS resource set). As an example, spatialrelationInfo which is information related to the SRS transmission and the UL TCI state may be each independently configured according to a situation or a case, or configured in combination with each other.

For example, the operation of the BS which transmits the SRS related configuration in step S1530 described above may be implemented by the devices in FIGS. 20 to 24 to be described below. For example, referring to FIG. 21, one or more processors 202 may control one or more transceivers 206 and/or one or more memories 204 so as to transmit the SRS related configuration, and one or more transceivers 206 may transmit, to the UE, the SRS related configuration.

The BS may receive, from the UE, the SRS transmitted based on the SRS related configuration (S1540). With respect to the above-described proposal method (e.g., Proposal 1 (Proposal 1-1/1-2)/Proposal 2 (Proposal 2-1/2-2/2-3/2-4), Proposal 3/Proposal, etc.), the BS may receive, from the UE, an SRS transmitted based on the configured/indicated UL TCI state.

For example, the operation of the BS which receives the SRS in step S1540 described above may be implemented by the devices in FIGS. 20 to 24 to be described below. For example, referring to FIG. 21, one or more processors 202 may control one or more transceivers 206 and/or one or more memories 204 so as to receive the SRS, and one or more transceivers 206 may receive the SRS to the UE.

FIG. 16 illustrates a PUSCH transmission procedure to which a method proposed in the present disclosure is applied.

Specifically, FIG. 16 illustrates an example of a PUSCH signaling between a user equipment (UE) and a base station (BS) based on the above-described proposal method (e.g., Proposal 1 (Proposal 1-1/1-2)/Proposal 2 (Proposal 2-1/2-2/2-3/2-4, etc.) (herein, the UE/BS is just an example, and may be replaced and applied with various devices as described in FIGS. 20 to 24 to be described below). FIG. 16 is just for convenience of the description and does not limit the scope of the present disclosure. Further, some step(s) illustrated in FIG. 16 may be omitted according to a situation and/or a configuration.

Hereinafter, the UE operation aspect will be described.

The UE may transmit UE capability information to the BS (S1610). The UE capability information may include UE capability information related to a panel. As an example, the UE capability information may include the number of panels (groups) which may be supported by the UE, information indicating whether multi-panel based simultaneous transmission may be performed, information on the MPUE category, etc. For example, the UE may transmit, the BS, UE capability information related to the above-described proposal methods (e.g., Proposal 1 (Proposal 1-1/1-2)/Proposal 2 (Proposal 2-1/2-2/2-3/2-4), Proposal 3/Proposal, etc.).

For example, the operation of the UE which transmits the UE capability information in step S1610 described above may be implemented by the devices in FIGS. 20 to 24 to be described below. For example, referring to FIG. 21, one or more processors 102 may control one or more transceivers 106 and/or one or more memories 104 to transmit the UE capability information, and one or more transceivers 106 may transmit the UE capability information to the BS.

The UE may receive a UL TCI state related configuration from the BS (S1620). The UL TCI state related configuration may include information for a configuration and/or an indication of a panel/beam related to uplink transmission (e.g., PUCCH/PUSCH/PRACH/SRS, etc.) of the UE. For example the UL TCI state related configuration may be configured based on the above-described method (e.g., Proposal 1 (Proposal 1-1/1-2)/Proposal 2 (Proposal 2-1/2-2/2-3/2-4), Proposal 3/Proposal 4, etc.). As an example, the UL TCI state related configuration may be configured based on the IE/field of Table 9/10 described above. The UL TCI state related configuration may be delivered through higher layer signaling (e.g., RRC signaling), etc.

For example, the operation of the UE which receives the UL TCI state related configuration in step S1620 described above may be implemented by the devices in FIGS. 20 to 24 to be described below. For example, referring to FIG. 21, one or more processors 102 may control one or more transceivers 106 and/or one or more memories 104 so as to receive the UL DCI state related configuration, and one or more transceivers 106 may receive, from the BS, the UL TCI state related configuration.

The UE may receive, from the BS, a PUSCH related configuration (e.g., PUSCH-Config, etc.) (S1630). The PUSCH related configuration may include configuration information related to the PUSCH transmission of the UE, and may be delivered through higher layer signaling (e.g., RRC signaling), etc. For example, the PUSCH related configuration may include configuration and/or indication information for a panel/beam related to the PUSCH transmission. As an example, the PUSCH related configuration may include configuration information for a correlation between a UL TCI state according to the above-described method (e.g., Proposal 1 (Proposal 1-1/1-2)/Proposal 2 (Proposal 2-1/2-2/2-3/2-4), Proposal 3/Proposal 4, etc.), and the corresponding PUSCH transmission (e.g., PUSCH resource). As an example, spatialrelationInfo which is information related to the PUSCH transmission and the UL TCI state may be each independently configured according to a situation or a case, or configured in combination with each other.

For example, the operation of the UE which receives the PUSCH related configuration in step S1630 described above may be implemented by the devices in FIGS. 20 to 24 to be described below. For example, referring to FIG. 21, one or more processors 102 may control one or more transceivers 106 and/or one or more memories 104 so as to receive the PUSCH related configuration, and one or more transceivers 106 may receive, from the BS, the PUSCH related configuration.

The UE may additionally receive a UL TCI state related MAC-CE from the BS (S1640). For example, as in the above-described proposal method (e.g., Proposal 1 (Proposal 1-1/1-2)/Proposal 2 (Proposal 2-1/2-2/2-3/2-4), Proposal 3/Proposal, etc.), the MAC-CE may be to update a mapping relationship (e.g., codepoint) of the UL TCI state field included in the UL DCI. Mapping information of the UL TCI state field included in the UL DCI for scheduling the PUSCH may also be updated through the MAC-CE.

For example, the operation of the UE which receives the MAC-CE in step S1640 described above may be implemented by the devices in FIGS. 20 to 24 to be described below. For example, referring to FIG. 21, one or more processors 102 may control one or more transceivers 106 and/or one or more memories 104 so as to receive the MAC-CE, and one or more transceivers 106 may receive the MAC-CE from the BS.

The UE may receive, from the BS, UL DCI for PUSCH scheduling (S1650). Here, the UL TCI may include (indication) information (e.g., field) for the UL TCI state such as the above-described method (e.g., Proposal 1 (Proposal 1-1/1-2)/Proposal 2 (Proposal 2-1/2-2/2-3/2-4), Proposal 3/Proposal 4, etc.). Further, the corresponding UL DCI may include an SRI field, etc., and the SRI field may coexist with information on the UL TCI state.

For example, the operation of the UE which receives the UL DCI in step S1650 described above may be implemented by the devices in FIGS. 20 to 24 to be described below. For example, referring to FIG. 21, one or more processors 102 may control one or more transceivers 106 and/or one or more memories 104 so as to receive the UL DCI, and one or more transceivers 106 may receive the UL DCI from the BS.

The UE may transmit, to the BS, the PUSCH based on information on the UL TCI state (S1660). Here, the information on the UL TCI state may be a UL TCI state indicating a panel/beam for PUSCH transmission. For example, with respect to the above-described proposal method (e.g., Proposal 1 (Proposal 1-1/1-2)/Proposal 2 (Proposal 2-1/2-2/2-3/2-4), Proposal 3/Proposal 4, etc.), the UE may transmit, to the BS, the PUSCH (through the panel(s) and/or beam(s) (e.g., a spatial filter related to the reference RS) indicated by the UL TCI state) based on the configured/indicated UL TCI state.

For example, the operation of the UE which transmits the PUSCH in step S1660 described above may be implemented by the devices in FIGS. 20 to 24 to be described below. For example, referring to FIG. 21, one or more processors 102 may control one or more transceivers 106 and/or one or more memories 104 so as to transmit the PUSCH, and one or more transceivers 106 may transmit the PUSCH to the BS.

Hereinafter, the BS operation aspect will be described.

The BS may receive UE capability information from the UE (S1610). The UE capability information may include UE capability information related to a panel. As an example, the UE capability information may include the number of panels (groups) which may be supported by the UE, information indicating whether multi-panel based simultaneous transmission may be performed, information on the MPUE category, etc. For example, the BS may receive, from the UE, UE capability information related to the above-described proposal method (e.g., Proposal 1 (Proposal 1-1/1-2)/Proposal 2 (Proposal 2-1/2-2/2-3/2-4), Proposal 3/Proposal, etc.).

For example, the operation of the BS which receives the UE capability information in step S1610 described above may be implemented by devices in FIGS. 20 to 24 to be described below. For example, referring to FIG. 21, one or more processors 202 may control one or more transceivers 206 and/or one or more memories 204 so as to receive the UE capability information, and one or more transceivers 206 may receive the UE capability information from the UE.

The BS may transmit a UL TCI state related configuration to the UE (S1620). The UL TCI state related configuration may include information for a configuration and/or an indication of a panel/beam related to uplink transmission (e.g., PUCCH/PUSCH/PRACH/SRS, etc.) of the UE. For example the UL TCI state related configuration may be configured based on the above-described method (e.g., Proposal 1 (Proposal 1-1/1-2)/Proposal 2 (Proposal 2-1/2-2/2-3/2-4), Proposal 3/Proposal 4, etc.). As an example, the UL TCI state related configuration may be configured based on the IE/field of Table 9/10 described above. The UL TCI state related configuration may be delivered through higher layer signaling (e.g., RRC signaling), etc.

For example, the operation of the BS which transmits the UL TCI state related configuration in step S1620 described above may be implemented by the devices in FIGS. 20 to 24 to be described below. For example, referring to FIG. 21, one or more processors 202 may control one or more transceivers 206 and/or one or more memories 204 so as to transmit the UL DCI state related configuration, and one or more transceivers 206 may transmit, to the UE, the UL TCI state related configuration.

The BS may transmit, to the UE, a PUSCH related configuration (e.g., PUSCH-Config, etc.) (S1630). The PUSCH related configuration may include configuration information related to the PUSCH transmission of the UE, and may be delivered through higher layer signaling (e.g., RRC signaling), etc. For example, the PUSCH related configuration may include configuration and/or indication information for a panel/beam related to the PUSCH transmission. As an example, the PUSCH related configuration may include configuration information for a correlation between a UL TCI state according to the above-described method (e.g., Proposal 1 (Proposal 1-1/1-2)/Proposal 2 (Proposal 2-1/2-2/2-3/2-4), Proposal 3/Proposal 4, etc.), and the corresponding PUSCH transmission (e.g., PUSCH resource). As an example, spatialrelationInfo which is information related to the PUSCH transmission and the UL TCI state may be each independently configured according to a situation or a case, or configured in combination with each other.

For example, the operation of the BS which transmits the PUSCH related configuration in step S1630 described above may be implemented by the devices in FIGS. 20 to 24 to be described below. For example, referring to FIG. 21, one or more processors 202 may control one or more transceivers 206 and/or one or more memories 204 so as to transmit the PUSCH related configuration, and one or more transceivers 206 may transmit, from the BS, the PUSCH related configuration.

The BS may additionally transmit a UL TCI state related MAC-CE to the UE (S1640). For example, as in the above-described proposal method (e.g., Proposal 1 (Proposal 1-1/1-2)/Proposal 2 (Proposal 2-1/2-2/2-3/2-4), Proposal 3/Proposal, etc.), the MAC-CE may be to update a mapping relationship (e.g., codepoint) of the UL TCI state field included in the UL DCI. Mapping information of the UL TCI state field included in the UL DCI for scheduling the PUSCH may also be updated through the MAC-CE.

For example, the operation of the BS which transmits the MAC-CE in step S1640 described above may be implemented by the devices in FIGS. 20 to 24 to be described below. For example, referring to FIG. 21, one or more processors 202 may control one or more transceivers 206 and/or one or more memories 204 so as to transmit the MAC-CE, and one or more transceivers 206 may transmit the MAC-CE from the BS.

The BS may transmit, to the UE, UL DCI for PUSCH scheduling (S1650). Here, the UL TCI may include (indication) information (e.g., field) for the UL TCI state such as the above-described method (e.g., Proposal 1 (Proposal 1-1/1-2)/Proposal 2 (Proposal 2-1/2-2/2-3/2-4), Proposal 3/Proposal 4, etc.). Further, the corresponding UL DCI may include a conventional SRI field, etc., and the SRI field may coexist with information on the UL TCI state.

For example, the operation of the BS which transits the UL DCI in step S1650 described above may be implemented by the devices in FIGS. 20 to 24 to be described below. For example, referring to FIG. 21, one or more processors 202 may control one or more transceivers 206 and/or one or more memories 204 so as to transmit the UL DCI, and one or more transceivers 206 may transmit the UL DCI from the BS.

The BS may receive, from the UE, the PUSCH transmitted based on information on the UL TCI state (S1660). Here, the information on the UL TCI state may be a UL TCI state indicating a panel/beam for PUSCH transmission. For example, with respect to the above-described proposal method (e.g., Proposal 1 (Proposal 1-1/1-2)/Proposal 2 (Proposal 2-1/2-2/2-3/2-4), Proposal 3/Proposal, etc.), the BS may receive, from the UE, a PUSCH transmitted based on the configured/indicated UL TCI state.

For example, the operation of the BS which receives the PUSCH in step S1660 described above may be implemented by the devices in FIGS. 20 to 24 to be described below. For example, referring to FIG. 21, one or more processors 202 may control one or more transceivers 206 and/or one or more memories 204 so as to receive the PUSCH, and one or more transceivers 206 may receive the PUSCH to the BS.

FIG. 17 illustrates a PRACH transmission procedure to which a method proposed in the present disclosure is applied.

Specifically, FIG. 17 illustrates an example of a PRACH signaling between a user equipment (UE) and a base station (BS) based on the above-described proposal method (e.g., Proposal 1 (Proposal 1-1/1-2)/Proposal 2 (Proposal 2-1/2-2/2-3/2-4, etc.) (herein, the UE/BS is just an example, and may be replaced and applied with various devices as described in FIGS. 20 to 24 to be described below). FIG. 17 is just for convenience of the description and does not limit the scope of the present disclosure. Further, some step(s) illustrated in FIG. 17 may be omitted according to a situation and/or a configuration.

Hereinafter, the UE operation aspect will be described.

The UE may transmit UE capability information to the BS (S1710). The UE capability information may include UE capability information related to a panel. As an example, the UE capability information may include the number of panels (groups) which may be supported by the UE, information indicating whether multi-panel based simultaneous transmission may be performed, information on the MPUE category, etc. For example, the UE may transmit, the BS, UE capability information related to the above-described proposal methods (e.g., Proposal 1 (Proposal 1-1/1-2)/Proposal 2 (Proposal 2-1/2-2/2-3/2-4), Proposal 3/Proposal, etc.).

For example, the operation of transmitting the UE capability information by the UE in step S1710 described above may be implemented by the devices in FIGS. 20 to 24 to be described below. For example, referring to FIG. 21, one or more processors 102 may control one or more transceivers 106 and/or one or more memories 104 to transmit the UE capability information, and one or more transceivers 106 may transmit the UE capability information to the BS.

The UE may receive a UL TCI state related configuration from the BS (S1720). The UL TCI state related configuration may include information for a configuration and/or an indication of a panel/beam related to uplink transmission (e.g., PUCCH/PUSCH/PRACH/SRS, etc.) of the UE. For example the UL TCI state related configuration may be configured based on the above-described method (e.g., Proposal 1 (Proposal 1-1/1-2)/Proposal 2 (Proposal 2-1/2-2/2-3/2-4), Proposal 3/Proposal 4, etc.). As an example, the UL TCI state related configuration may be configured based on the IE/field of Table 9/10 described above. The UL TCI state related configuration may be delivered through higher layer signaling (e.g., RRC signaling), etc.

For example, the operation of the UE which receives the UL TCI state related configuration in step S1720 described above may be implemented by the devices in FIGS. 20 to 24 to be described below. For example, referring to FIG. 21, one or more processors 102 may control one or more transceivers 106 and/or one or more memories 104 so as to receive the UL DCI state related configuration, and one or more transceivers 106 may receive, from the BS, the UL TCI state related configuration.

The UE may receive, from the BS, an RACH related configuration (e.g., PUCCH-Config, etc.) (S1730). As described above, the corresponding RACH related configuration may be related to a Contention-Free Random Access (CFRA) (e.g., PDCCH-ordered PRACH). The RACH related configuration may include configuration information related to the PRACH transmission of the UE, and may be delivered through higher layer signaling (e.g., RRC signaling), etc. For example, the PRACH related configuration may include configuration and/or indication information for a panel/beam related to the PRACH transmission. As an example, the PRACH related configuration may include configuration information for a correlation between a UL TCI state according to the above-described method (e.g., Proposal 1 (Proposal 1-1/1-2)/Proposal 2 (Proposal 2-1/2-2/2-3/2-4), Proposal 3/Proposal 4, etc.) (and/or SSB-RI, CRI, etc.), and the corresponding PRACH transmission (e.g., PRACH resource/PRACH preamble). As an example, the UL TCI state may be applied independently from or combinationally with SSB-RI/CRI configured to the PRACH transmission or the SSB-RI/CRI may be replaced with information on the UL TCI state.

For example, the operation of the UE which receives the RACH related configuration in step S1730 described above may be implemented by the devices in FIGS. 20 to 24 to be described below. For example, referring to FIG. 21, one or more processors 102 may control one or more transceivers 106 and/or one or more memories 104 so as to receive the RACH related configuration, and one or more transceivers 106 may receive, from the BS, the RACH related configuration.

The UE may transmit, to the BS, the RACH based on the PRACH related configuration (S1740). As described above, the corresponding PRACH may be related to a Contention-Free Random Access (CFRA) (e.g., PDCCH-ordered PRACH). With respect to the above-described proposal method (e.g., Proposal 1 (Proposal 1-1/1-2)/Proposal 2 (Proposal 2-1/2-2/2-3/2-4), Proposal 3/Proposal, etc.), the UE may transmit, to the BS, the PRACH based on the configured/indicated UL TCI state. That is, the UE may perform an RACH procedure based on the configured/indicated UL TCI state (through a panel(s) a beam(s) indicated by the UL TCI state (e.g., a spatial filter related to a reference RS)).

For example, the operation of the UE which transmits the PRACH in step S1740 described above may be implemented by the devices in FIGS. 20 to 24 to be described below. For example, referring to FIG. 21, one or more processors 102 may control one or more transceivers 106 and/or one or more memories 104 so as to transmit the PRACH, and one or more transceivers 106 may transmit the PRACH to the BS.

Hereinafter, the BS operation aspect will be described.

The BS may receive UE capability information from the UE (S1710). The UE capability information may include UE capability information related to a panel. As an example, the UE capability information may include the number of panels (groups) which may be supported by the UE, information indicating whether multi-panel based simultaneous transmission may be performed, information on the MPUE category, etc. For example, the BS may receive, from the UE, UE capability information related to the above-described proposal method (e.g., Proposal 1 (Proposal 1-1/1-2)/Proposal 2 (Proposal 2-1/2-2/2-3/2-4), Proposal 3/Proposal, etc.).

For example, the operation of the BS which receives the UE capability information in step S1710 described above may be implemented by devices in FIGS. 20 to 24 to be described below. For example, referring to FIG. 21, one or more processors 202 may control one or more transceivers 206 and/or one or more memories 204 to receive the UE capability information, and one or more transceivers 206 may receive the UE capability information from the UE.

The BS may transmit a UL TCI state related configuration to the UE (S1720). The UL TCI state related configuration may include information for a configuration and/or an indication of a panel/beam related to uplink transmission (e.g., PUCCH/PUSCH/PRACH/SRS, etc.) of the UE. For example the UL TCI state related configuration may be configured based on the above-described method (e.g., Proposal 1 (Proposal 1-1/1-2)/Proposal 2 (Proposal 2-1/2-2/2-3/2-4), Proposal 3/Proposal 4, etc.). As an example, the UL TCI state related configuration may be configured based on the IE/field of Table 9/10 described above. The UL TCI state related configuration may be delivered through higher layer signaling (e.g., RRC signaling), etc.

For example, the operation of the BS which transmits the UL TCI state related configuration in step S1720 described above may be implemented by the devices in FIGS. 20 to 24 to be described below. For example, referring to FIG. 21, one or more processors 202 may control one or more transceivers 206 and/or one or more memories 204 so as to transmit the UL DCI state related configuration, and one or more transceivers 206 may transmit, to the UE, the UL TCI state related configuration.

The BS may transmit, to the UE, an RACH related configuration (e.g., PUCCH-Config, etc.) (S1730). As described above, the corresponding RACH related configuration may be related to a Contention-Free Random Access (CFRA) (e.g., PDCCH-ordered PRACH). The RACH related configuration may include configuration information related to the PRACH transmission of the UE, and may be delivered through higher layer signaling (e.g., RRC signaling), etc. For example, the PRACH related configuration may include configuration and/or indication information for a panel/beam related to the PRACH transmission. As an example, the PRACH related configuration may include configuration information for a correlation between a UL TCI state according to the above-described method (e.g., Proposal 1 (Proposal 1-1/1-2)/Proposal 2 (Proposal 2-1/2-2/2-3/2-4), Proposal 3/Proposal 4, etc.) (and/or SSB-RI, CRI, etc.), and the corresponding PRACH transmission (e.g., PRACH resource/PRACH preamble). As an example, the UL TCI state may be applied independently from or combinationally with SSB-RI/CRI configured to the PRACH transmission or the SSB-RI/CRI may be replaced with information on the UL TCI state.

For example, the operation of the BS which transmits the RACH related configuration in step S1730 described above may be implemented by the devices in FIGS. 20 to 24 to be described below. For example, referring to FIG. 21, one or more processors 202 may control one or more transceivers 206 and/or one or more memories 204 so as to transmit the RACH related configuration, and one or more transceivers 206 may transmit, to the UE, the RACH related configuration.

The BS may receive, from the UE, the PRACH transmitted based on the PRACH related configuration (S1740). As described above, the corresponding PRACH may be related to a Contention-Free Random Access (CFRA) (e.g., PDCCH-ordered PRACH). With respect to the above-described proposal method (e.g., Proposal 1 (Proposal 1-1/1-2)/Proposal 2 (Proposal 2-1/2-2/2-3/2-4), Proposal 3/Proposal, etc.), the BS may receive, from the UE, a PRACH transmitted based on the configured/indicated UL TCI state. That is, the BS may perform the RACH procedure based on the configured/indicated UL TCI state.

For example, the operation of the BS which receives the PRACH in step S1740 described above may be implemented by the devices in FIGS. 20 to 24 to be described below. For example, referring to FIG. 21, one or more processors 202 may control one or more transceivers 206 and/or one or more memories 204 so as to receive the PRACH, and one or more transceivers 206 may receive the PRACH from the UE.

As mentioned above, the UE operation and/or the BS operation (e.g., Proposal 1 (Proposal 1-1/1-2)/Proposal 2 (Proposal 2-1/2-2/2-3/2-4), Proposal 3/Proposal 4, etc.) may be implemented by the devices (e.g., FIGS. 20 to 24) to be described below. For example, the UE may correspond to a first wireless device/receiving device, and the BS may correspond to a second wireless device/transmitting device, and in some cases, an opposite case thereto may also be considered. Further, the UE and/or BS operations (e.g., Proposal 1 (Proposal 1-1/1-2)/Proposal 2 (Proposal 2-1/2-2/2-3/2-4), Proposal 3/Proposal 4, etc.) may be processed by the processor 102/202 of FIG. 21 and/or the control unit 120 of FIG. 23/FIG. 24. Further, the UE and/or BS operations (Proposal 1-1/1-2)/Proposal 2 (Proposal 2-1/2-2/2-3/2-4), Proposal 3/Proposal 4, etc.) may be stored in a memory (e.g., a memory 104/204 of FIG. 21 and a memory unit 130 of FIG. 23/FIG. 24) in a form of a command/program (e.g., instruction(s), executable code(s)) for driving at least one processor or control unit of FIG. 21/23/24 above.

Hereinafter, the above-described embodiments will be described in detail with reference to FIG. 18 in terms of the operation of the UE. Methods to be described below are just distinguished for convenience and it is needless to say that some components of any one method may be substituted with some components of another method or may be applied in combination with each other.

FIG. 18 is a flowchart for describing a method of transmitting, by a UE, an uplink signal in a wireless communication system according to an embodiment of the present disclosure.

Referring to FIG. 18, a method for transmitting, by a UE, an uplink signal in a wireless communication system according to an embodiment of the present disclosure includes receiving configuration information related to transmission of an uplink signal (S1810) and transmitting the uplink signal based on the configuration information (S1820).

In S1810, the UE receives, from the BS, the configuration information related to the transmission of the uplink signal.

According to an embodiment, the configuration information may include a transmission configuration indicator state (TCI state). The embodiment may be based on any one of Proposals 1 to 4 above.

The configuration information includes a UL-TCI state configuration of Proposal 1 above. The configuration information may further include a configuration (e.g., PUCCH-config/PUSCH-config/SRS-config/PRACH-config) of the uplink signal.

Specifically, the configuration information may be based on the configuration information in FIGS. 14 to 17 above. As an example, the configuration information may be based on a UL TCI state related configuration and a PUCCH related configuration (e.g., PUCCH-Config) of FIG. 14. As another example, the configuration information may be based on the UL TCI state related configuration and an SRS related configuration (e.g., SRS-Config) of FIG. 15. Each of the UL TCI state related configuration and uplink signal related configuration information (e.g., PUCCH-Config, SRS-Config) included in the configuration information may be separately transmitted.

The TCI state may be related to at least one of i) a penal ID indicating any one of a plurality of panels, ii) a reference RS related to a spatial domain filter for the transmission of the uplink, or iii) the type of uplink signal.

According to an embodiment, the TCI state may be configured for each specific resource group including a plurality of uplink resources. The embodiment may be based on Proposal 2-4 above. The plurality of uplink resources may be related to a common attribute.

According to an embodiment, the TCI state may be related to at least one of 1) a UL power control related parameter for each panel ID, 2) a timing advance (TA) for each panel ID, or 3) mapping information between a port of a phase tracking reference signal (PTRS) related to the transmission of the uplink signal and the panel ID. The embodiment may be based on Proposal 1-2 above.

The UL power control related parameter for each panel ID may be based on the reference RS configured in the TCI state. That is, the UL power control related parameter may be changed according to the reference RS configured in the TCI state.

According to S1810 described above, an operation of the UE (100/200 in FIGS. 20 to 20) which receives, from the BS (100/200 in FIGS. 20 to 24), the configuration information of related to the transmission of the uplink signal may be implemented by the devices in FIGS. 20 to 24. For example, referring to FIG. 21, one or more processors 102 may control one or more transceivers 106 and/or one or more memories 104 so as to receive, from the BS 200, the configuration information related to the transmission of the uplink signal.

In S1820, the UE transmits, to the BS, the uplink signal based on the configuration information.

According to an embodiment, the uplink signal may be transmitted based on a specific panel and/or a specific spatial domain filter, according to the TCI state in which the panel ID and/or the reference RS is not configured. The embodiment may be based on at least any one of Proposals 2-1/2-2/2-3/2-4 above.

The specific spatial domain filter and the specific panel may be based on determination of the UE. That is, the specific spatial domain filter and the specific panel are a spatial domain filter/panel not determined by the configuration/indication of the BS, but determined by the UE.

The uplink signal may be related to a specific usage. Specifically, the uplink signal may be based on a sounding reference signal (SRS) for beam management.

According to an embodiment, the specific panel may be changed based on a specific resource unit based on the TCI state in which the panel ID is not configured. The embodiment may be based on any one of Proposals 2-3/2-4 above.

As an example, the specific resource unit may be based on contiguous SRS resources.

The contiguous SRS resources may be related to at least one of 1), 2), or 3).

1) SRS resources ID arranged in a specific order
2) a location of each SRS resource on a time domain
3) an angular domain of a spatial domain filter configured in each SRS resource.

As another example, the specific resource unit may be based on an SRS resource group including SRS resources related to the same panel.

According to an embodiment, the uplink signal may be based on a physical uplink shared channel (PUSCH). The embodiment may be based on Proposal 3 above. Transmission of the PUSCH may be based on i) the TCI state and ii) an SRI field related to downlink control information (DCI) for scheduling the PUSCH. A spatial domain filter for the transmission of the PUSCH may be determined based on the TCI state.

According to an embodiment, the transmission of the uplink signal may be based on the TCI state related to at least one of a plurality of reference RSs or a plurality of panel IDs or ii) a plurality of TCI states. The embodiment may be based on Proposal 4 above.

According to S1820 described above, an operation of the UE (reference numeral 100/200 in FIGS. 20 to 24) which transmits, to the BS (reference numeral 100/200 in FIGS. 20 to 24), the uplink signal based on the configuration information may be implemented by the devices of FIGS. 20 to 24. For example, referring to FIG. 21, one or more processors 102 may control one or more transceivers 106 and/or one or more memories 104 so as to transmit, to the BS 200, the uplink signal based on the configuration information.

Hereinafter, the above-described embodiments will be described in detail with reference to FIG. 19 in terms of the operation of the BS. Methods to be described below are just distinguished for convenience and it is needless to say that some components of any one method may be substituted with some components of another method or may be applied in combination with each other.

FIG. 19 is a flowchart for describing a method of receiving, by a BS, an uplink signal in a wireless communication system according to another embodiment of the present disclosure.

Referring to FIG. 19, a method for receiving, by a BS, an uplink signal in a wireless communication system according to another embodiment of the present disclosure includes transmitting configuration information related to transmission of the uplink signal (S1910) and receiving the uplink signal based on the configuration information (S1920).

In S1910, the BS transmits, to the UE, configuration information related to the transmission of the uplink signal.

According to an embodiment, the configuration information may include a transmission configuration indicator state (TCI state). The embodiment may be based on any one of Proposals 1 to 4 above.

The configuration information includes a UL-TCI state configuration of Proposal 1 above. The configuration information may further include a configuration (e.g., PUCCH-config/PUSCH-config/SRS-config/PRACH-config) of the uplink signal.

Specifically, the configuration information may be based on the configuration information in FIGS. 14 to 17 above. As an example, the configuration information may be based on a UL TCI state related configuration and a PUCCH related configuration (e.g., PUCCH-Config) of FIG. 14. As another example, the configuration information may be based on the UL TCI state related configuration and an SRS related configuration (e.g., SRS-Config) of FIG. 15. Each of the UL TCI state related configuration and uplink signal related configuration information (e.g., PUCCH-Config, SRS-Config) included in the configuration information may be separately transmitted.

The TCI state may be related to at least one of i) a penal ID indicating any one of a plurality of panels, ii) a reference RS related to a spatial domain filter for the transmission of the uplink, or iii) the type of uplink signal.

According to an embodiment, the TCI state may be configured for each specific resource group including a plurality of uplink resources. The embodiment may be based on Proposal 2-4 above. The plurality of uplink resources may be related to a common attribute.

According to an embodiment, the TCI state may be related to at least one of 1) a UL power control related parameter for each panel ID, 2) a timing advance (TA) for each panel ID, or 3) mapping information between a port of a phase tracking reference signal (PTRS) related to the transmission of the uplink signal and the panel ID. The embodiment may be based on Proposal 1-2 above.

The UL power control related parameter for each panel ID may be based on the reference RS configured in the TCI state. That is, the UL power control related parameter may be changed according to the reference RS configured in the TCI state.

According to S1910 described above, an operation of the BS (100/200 in FIGS. 20 to 20) which transmits, to the UE (100/200 in FIGS. 20 to 24), the configuration information related to the transmission of the uplink signal may be implemented by the devices in FIGS. 20 to 24. For example, referring to FIG. 21, one or more processors 202 may control one or more transceivers 206 and/or one or more memories 204 so as to transmit, to the UE 100, the configuration information related to the transmission of the uplink signal.

In S1920, the BS receives, from the UE, the uplink signal based on the configuration information.

According to an embodiment, the uplink signal may be transmitted based on a specific panel and/or a specific spatial domain filter, according to the TCI state in which the panel ID and/or the reference RS is not configured. The embodiment may be based on at least any one of Proposals 2-1/2-2/2-3/2-4 above.

The specific spatial domain filter and the specific panel may be based on determination of the UE. That is, the specific spatial domain filter and the specific panel are a spatial domain filter/panel not determined by the configuration/indication of the BS, but determined by the UE.

The uplink signal may be related to a specific usage. Specifically, the uplink signal may be based on a sounding reference signal (SRS) for beam management.

According to an embodiment, the specific panel may be changed based on a specific resource unit based on the TCI state in which the panel ID is not configured. The embodiment may be based on any one of Proposals 2-3/2-4 above.

As an example, the specific resource unit may be based on contiguous SRS resources.

The contiguous SRS resources may be related to at least one of 1), 2), or 3).

1) SRS resources ID arranged in a specific order
2) a location of each SRS resource on a time domain
3) an angular domain of a spatial domain filter configured in each SRS resource.

As another example, the specific resource unit may be based on an SRS resource group including SRS resources related to the same panel.

According to an embodiment, the uplink signal may be based on a physical uplink shared channel (PUSCH). The embodiment may be based on Proposal 3 above. Transmission of the PUSCH may be based on i) the TCI state and ii) an SRI field related to downlink control information (DCI) for scheduling the PUSCH. A spatial domain filter for the transmission of the PUSCH may be determined based on the TCI state.

According to an embodiment, the transmission of the uplink signal may be based on the TCI state related to at least one of a plurality of reference RSs or a plurality of panel IDs or ii) a plurality of TCI states. The embodiment may be based on Proposal 4 above.

According to S1920 described above, an operation of the BS (reference numeral 100/200 in FIGS. 20 to 24) which receives, from the UE (reference numeral 100/200 in FIGS. 20 to 24), the uplink signal based on the configuration information may be implemented by the devices in FIGS. 20 to 24. For example, referring to FIG. 21, one or more processors 202 may control one or more transceivers 206 and/or one or more memories 204 so as to receive, from the UE 100, the uplink signal based on the configuration information.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 20 illustrates a communication system 1 applied to the present disclosure.

Referring to FIG. 20, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure

FIG. 21 illustrates wireless devices applicable to the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 22 illustrates a signal process circuit for a transmission signal.

Referring to FIG. 22, a signal processing circuit 1000 may include scramblers 1010, modulators 1020, a layer mapper 1030, a precoder 1040, resource mappers 1050, and signal generators 1060. An operation/function of FIG. 22 may be performed, without being limited to, the processors 102 and 202 and/or the transceivers 106 and 206 of FIG. 21. Hardware elements of FIG. 22 may be implemented by the processors 102 and 202 and/or the transceivers 106 and 206 of FIG. 21. For example, blocks 1010 to 1060 may be implemented by the processors 102 and 202 of FIG. 21. Alternatively, the blocks 1010 to 1050 may be implemented by the processors 102 and 202 of FIG. 21 and the block 1060 may be implemented by the transceivers 106 and 206 of FIG. 21.

Codewords may be converted into radio signals via the signal processing circuit 1000 of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 22. For example, the wireless devices (e.g., 100 and 200 of FIG. 21) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 23 illustrates another example of a wireless device applied to the present disclosure.

The wireless device may be implemented in various forms according to a use-case/service (refer to FIG. 20). Referring to FIG. 23, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. 20), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 24 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 24, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Hereinafter, effects of the method for transmitting and receiving an uplink signal in a wireless communication system, and the device for the same according to an embodiment of the present disclosure are described below.

According to an embodiment of the present disclosure, an uplink signal is transmitted based on configuration information including a Transmission Configuration Indicator (TCI) state. The TCI state is related to at least one of i) a penal ID indicating any one of a plurality of panels, ii) a reference RS related to a spatial domain filter for the transmission of the uplink, or iii) the type of uplink signal.

The integrated configuration can be provided for all types of uplink signal transmission through the embodiment as described above, so signaling overhead and a delay are reduced as compared with a case where transmission configuration related signaling is performed for each type of uplink signal.

According to an embodiment of the present disclosure, the uplink signal may be related to a specific usage. Specifically, the uplink signal may be based on a sounding reference signal (SRS) for beam management. The uplink signal may be transmitted based on a specific panel and/or a specific spatial domain filter, according to the TCI state in which the panel ID and/or the reference RS is not configured.

Accordingly, 1) since a flexibility of a UE behavior related to determination of a panel/beam is improved, the transmission of the uplink signal may be performed so as to be more suitable for a UE capability. 2) The beam management may be performed based on a preference beam/panel combination determined by the UE, so latency and overhead are reduced as compared with a case where beam sweeping is performed based on all panels. 3) A case where the preference beam/panel combination determined by the UE is utilized is limited to a specific uplink channel to prevent ambiguity on the UE behavior.

According to an embodiment of the present disclosure, the specific panel is changed based on a specific resource unit based on the TCI state in which the panel ID is not configured.

As an example, the specific resource unit is based on contiguous SRS resources. The contiguous SRS resources may be related to 1) SRS resource ID arranged in a specific order, 2) a location of each SRS resource in a time domain, 3) an angular domain of a spatial domain filter configured in each SRS resource, and at least one of 1), 2), or 3). Accordingly, contiguous SRS resources related to a panel change are specifically limited to more effectively perform the beam sweeping.

As another example, the specific resource unit may be based on an SRS resource group including SRS resources related to the same panel. Accordingly, the number of panel switching times is reduced as compared with a case where the panel is changed for each SRS resource, so the latency according to a panel switching delay is reduced and a guard period is reduced, and as a result, wasted resources may be reduced.

According to an embodiment of the present disclosure, the TCI state may be configured for each specific resource group including a plurality of uplink resources. The plurality of uplink resources is related to a common attribute. The TCI state is configured for each specific resource group constituted by resources having the common attribute, so the overhead is reduced and the flexibility of the TCI state configuration is increased as compared with a case where the TCI state is configured for each resource.

According to an embodiment of the present disclosure, the uplink signal may be based on a physical uplink shared channel (PUSCH). Transmission of the PUSCH is based on i) the TCI state and ii) an SRI field related to downlink control information (DCI) for scheduling the PUSCH. A spatial domain filter for the transmission of the PUSCH is determined based on the TCI state. Accordingly, in the case of the transmission of the PUSCH, an existing SRI field indicating the beam may be utilized to indicate a rank, a precoder, etc., by complementing the TCI state.

According to an embodiment of the present disclosure, the transmission of the uplink signal may be based on the TCI state related to at least one of a plurality of reference RSs or a plurality of panel IDs or ii) a plurality of TCI states.

Accordingly, a simultaneous transmission across multi-panel (STxMP) behavior through multi-panels of the corresponding UE may be effectively supported through the TCI state.

According to an embodiment of the present disclosure, the TCI state may be related to at least one of 1) a UL power control related parameter for each panel ID, 2) a timing advance (TA) for each panel ID, or 3) mapping information between a port of a phase tracking reference signal (PTRS) related to the transmission of the uplink signal and the panel ID. Accordingly, the uplink signal may be transmitted based on a wireless channel situation for each channel, so reliability is enhanced.

A pathloss value or a reference signal received power (RSRP) value may vary when previously receiving a corresponding DL RS according to a reference RS is an SSB-RI or a CRI. According to an embodiment of the present disclosure, the UL power control related parameter for each panel ID may be based on the reference RS configured in the TCI state. Accordingly, a power control may be performed so as to transmit the uplink signal with a quality which is the same as a quality according to the reference RS of the TCI state.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by subsequent amendment after the application is filed.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method performed by a user equipment (UE) in a wireless communication system, the method comprising:
receiving configuration information related to the transmission of an uplink signal; and
transmitting the uplink signal based on the configuration information,
wherein the configuration information includes a transmission configuration indicator (TCI) state,
wherein the TCI state is related to at least one of i) a panel identifier (ID) indicating any one of a plurality of panels, ii) a reference signal (RS) related to a spatial domain filter for the transmission of the uplink signal, or iii) a type of the uplink signal,
wherein, based on the TCI state in which at least one of the panel ID or the RS is not configured, the uplink signal is transmitted based on a specific panel, and, the specific panel is changed based on a specific resource unit of adjacent sounding reference signal (SRS) resources related to a location of each SRS resource on a time domain.

2. The method of claim 1, wherein the specific panel is based on a spatial domain filter and a panel which are determined of by the UE.

3. The method of claim 2, wherein the uplink signal is related to a specific usage including a beam management.

4. The method of claim 2, wherein the uplink signal is based on a SRS for a beam management.

5. The method of claim 1,
wherein the adjacent SRS resources are further related to at least one of
1) SRS resource ID arranged in a specific order, or
2) an angular domain of a spatial domain filter configured in each SRS resource.

6. The method of claim 1, wherein the specific resource unit is based on an SRS resource group including SRS resources related to the same panel.

7. The method of claim 1, wherein the TCI state is configured for each of one or more reference signal groups including a plurality of uplink resources.

8. The method of claim 7, wherein the plurality of uplink resources is related to a common attribute which is based on a spatial relation in association with a beam used for a signal transmission.

9. The method of claim 1, wherein the uplink signal is based on a physical uplink shared channel (PUSCH),
wherein transmission of the PUSCH is performed based on i) the TCI state and ii) a sounding reference signal resource identifier (SRI) field related to downlink control information (DCI) for scheduling the PUSCH, and
wherein a spatial domain filter for the transmission of the PUSCH is determined based on the TCI state.

10. The method of claim 1, wherein the transmission of the uplink signal is based on i) the TCI state related to at least one of a plurality of reference signals (RSs) or a plurality of panel IDs or ii) a plurality of TCI states.

11. The method of claim 1, wherein the TCI state is related to at least one of 1) a UL power control related parameter for each panel ID, 2) a timing advance (TA) for each panel ID, or 3) mapping information between a Phase Tracking Reference Signal (PTRS) port related to the transmission of the uplink signal and the panel ID.

12. The method of claim 11, wherein the UL power control related parameter for each panel ID is based on the RS configured in the TCI state.

13. A user equipment (UE) configured to operate in a wireless communication system, the UE comprising:
one or more transceivers;
one or more processors controlling the one or more transceivers; and
one or more memories operatively connectable to the one or more processors, and storing instructions that, when executed by the one or more processors, configure the one or more processors to perform operations,
wherein the operations include:
receiving configuration information related to the transmission of an uplink signal; and
transmitting the uplink signal based on the configuration information, and
wherein the configuration information includes a transmission configuration indicator (TCI) state,
wherein the TCI state is related to at least one of i) a panel identifier (ID) indicating any one of a plurality of panels, ii) a reference signal (RS) related to a spatial domain filter for the transmission of the uplink signal, or iii) a type of the uplink signal, and
wherein, based on the TCI state in which at least one of the panel ID or the RS is not configured, the uplink signal is transmitted based on a specific panel, and, the specific panel is changed based on a specific resource unit of adjacent sounding reference signal (SRS) resources related to a location of each SRS resource on a time domain.

14. A method performed by a base station (BS) in a wireless communication system, the method comprising:
transmitting configuration information related to transmission of an uplink signal; and
receiving the uplink signal based on the configuration information,
wherein the configuration information includes a transmission configuration indicator (TCI) state,
wherein the TCI state is related to at least one of i) a panel identifier (ID) indicating any one of a plurality of panels, ii) a reference signal (RS) related to a spatial domain filter for the transmission of the uplink signal, or iii) a type of the uplink signal, and
wherein, based on the TCI state in which at least one of the panel ID or the RS is not configured, the uplink signal is transmitted based on a specific panel, and, the specific panel is changed based on a specific resource unit of adjacent sounding reference signal (SRS) resources related to a location of each SRS resource on a time domain.

* * * * *